(12) United States Patent
White et al.

(10) Patent No.: US 10,841,365 B2
(45) Date of Patent: Nov. 17, 2020

(54) MAPPING APPLICATION DEPENDENCIES IN A COMPUTER NETWORK

(71) Applicant: Tanium Inc., Emeryville, CA (US)

(72) Inventors: Andrew R. White, Apex, NC (US); Zakary A. Kus, San Francisco, CA (US); Michael W. Broome, Durham, NC (US); Christian L. Hunt, Chapel Hill, NC (US); Rahul R. Jaswa, San Francisco, CA (US)

(73) Assignee: TANIUM INC., Emeryville, CA (US)

( * ) Notice: Subject to any disclaimer, the term of this patent is extended or adjusted under 35 U.S.C. 154(b) by 0 days.

(21) Appl. No.: 16/430,336

(22) Filed: Jun. 3, 2019

(65) Prior Publication Data

US 2020/0028890 A1    Jan. 23, 2020

Related U.S. Application Data

(60) Provisional application No. 62/700,171, filed on Jul. 18, 2018.

(51) Int. Cl.
*H04L 29/08* (2006.01)
*H04L 12/24* (2006.01)
(Continued)

(52) U.S. Cl.
CPC .............. *H04L 67/10* (2013.01); *G06F 16/22* (2019.01); *H04L 41/12* (2013.01); *H04L 61/2007* (2013.01)

(58) Field of Classification Search
CPC ..... H04L 67/10; H04L 41/12; H04L 61/2007; G06F 16/02
(Continued)

(56) References Cited

U.S. PATENT DOCUMENTS 5,220,596 A * 6/1993 Patel ................. H04M 3/53325
                                                    379/88.27
5,842,202 A * 11/1998 Kon .................... G06F 11/0727
(Continued)

FOREIGN PATENT DOCUMENTS

EP     1553747 A1    7/2005
EP     2493118 A1    8/2012

OTHER PUBLICATIONS

Abdalkarim Awad et al., Virtual Cord Protocol (VCP): A Flexible DHT-like Routing Service for Sensor Networks, In Proceedings of the 5th IEEE International Conference on Mobile Ad Hoc and Sensor Systems, 2008, 10 pp. 133-142.*

(Continued)

*Primary Examiner* — Tauqir Hussain
(74) *Attorney, Agent, or Firm* — Morgan, Lewis & Bockius LLP

(57) ABSTRACT

This application is directed to a mapping method performed at a computational machine in a linear communication orbit. The computational machine receives an application definition the linear communication orbit. The application definition specifies criteria for establishing whether the computational machine executes a specified application, a component of the specified application, or communicate with another node executing the specified application or a component of the specified application. While a plurality of events are occurring locally at the computational machine, the computational machine identifies one or more operations meeting the application definition in real-time. The identified one or more operations meeting the application definition, and associated metadata are stored in a local mapping database of the computational machine and returned to the server system through the linear communication orbit in (Continued)

US 10,841,365 B2

Page 2 response to a map request received through the linear communication orbit.

49 Claims, 18 Drawing Sheets

(51) Int. Cl.
*H04L 29/12* (2006.01)
*G06F 16/22* (2019.01)

(58) Field of Classification Search
USPC .......................................................... 709/223
See application file for complete search history.

(56) References Cited

U.S. PATENT DOCUMENTS

| | | | |
|---|---|---|---|
| 5,949,755 A | 9/1999 | Uphadya et al. | |
| 6,049,828 A | 4/2000 | Dev et al. | |
| 6,615,213 B1 | 9/2003 | Johnson | |
| 6,879,979 B2 | 4/2005 | Hindawi et al. | |
| 6,885,644 B1 | 4/2005 | Knop et al. | |
| 7,043,550 B2 | 5/2006 | Knop et al. | |
| 7,120,693 B2 | 10/2006 | Chang et al. | |
| 7,240,044 B2* | 7/2007 | Chaudhuri | G06F 16/24545 |
| 7,299,047 B2 | 11/2007 | Dolan et al. | |
| 7,555,545 B2 | 6/2009 | McCasland | |
| 7,600,018 B2 | 10/2009 | Maekawa et al. | |
| 7,698,453 B2 | 4/2010 | Samuels et al. | |
| 7,720,641 B2 | 5/2010 | Alagappan et al. | |
| 7,761,557 B2 | 7/2010 | Fellenstein et al. | |
| 7,844,687 B1 | 11/2010 | Gelvin et al. | |
| 8,078,668 B2 | 12/2011 | Moreau | |
| 8,086,729 B1 | 12/2011 | Hindawi et al. | |
| 8,139,508 B1* | 3/2012 | Roskind | H04L 67/1065 |
| | | | 370/255 |
| 8,185,612 B1 | 5/2012 | Arolovitch et al. | |
| 8,185,615 B1 | 5/2012 | McDysan et al. | |
| 8,271,522 B2 | 9/2012 | Mehul et al. | |
| 8,392,530 B1 | 3/2013 | Manapragada et al. | |
| 8,477,660 B2 | 7/2013 | Lee et al. | |
| 8,504,879 B2 | 8/2013 | Poletto et al. | |
| 8,510,562 B2 | 8/2013 | Ramakrishnan et al. | |
| 8,813,228 B2* | 8/2014 | Magee | H04L 63/20 |
| | | | 726/24 |
| 8,885,521 B2 | 11/2014 | Wang et al. | |
| 8,903,973 B1 | 12/2014 | Hindawi et al. | |
| 8,904,039 B1* | 12/2014 | Hindawi | H04L 12/6418 |
| | | | 709/243 |
| 9,009,827 B1* | 4/2015 | Albertson | H04L 63/14 |
| | | | 726/22 |
| 9,059,961 B2 | 6/2015 | Hindawi et al. | |
| 9,246,977 B2 | 1/2016 | Hindawi et al. | |
| 9,609,007 B1* | 3/2017 | Rivlin | H04L 51/12 |
| 9,667,738 B2 | 5/2017 | Hindawi et al. | |
| 9,716,649 B2 | 7/2017 | Bent et al. | |
| 9,769,037 B2 | 9/2017 | Hindawi et al. | |
| 9,800,603 B1 | 10/2017 | Sidagni et al. | |
| 9,985,982 B1* | 5/2018 | Bartos | G06F 21/566 |
| 10,095,864 B2 | 10/2018 | Hunt et al. | |
| 10,136,415 B2 | 11/2018 | Hindawi et al. | |
| 2001/0056461 A1 | 12/2001 | Kampe et al. | |
| 2002/0007404 A1 | 1/2002 | Vange et al. | |
| 2002/0042693 A1 | 4/2002 | Kampe et al. | |
| 2002/0073086 A1 | 6/2002 | Thompson et al. | |
| 2002/0198867 A1* | 12/2002 | Lohman | G06F 16/24549 |
| 2003/0101253 A1 | 5/2003 | Saito et al. | |
| 2003/0131044 A1 | 7/2003 | Nagendra et al. | |
| 2003/0212676 A1 | 11/2003 | Bruce et al. | |
| 2003/0212821 A1* | 11/2003 | Gillies | H04L 45/02 |
| | | | 709/238 |
| 2004/0076164 A1 | 4/2004 | Vanderveen et al. | |
| 2004/0190085 A1 | 9/2004 | Silverbrook et al. | |
| 2005/0004907 A1* | 1/2005 | Bruno | G06F 16/2462 |
| 2005/0108356 A1 | 5/2005 | Rosu et al. | |

| | | | |
|---|---|---|---|
| 2005/0108389 A1 | 5/2005 | Kempin et al. | |
| 2005/0195755 A1 | 9/2005 | Senta et al. | |
| 2006/0039371 A1 | 2/2006 | Castro et al. | |
| 2006/0128406 A1* | 6/2006 | Macartney | H04W 12/1208 |
| | | | 455/466 |
| 2007/0005738 A1 | 1/2007 | Alexion-Tiernan et al. | |
| 2007/0211651 A1 | 9/2007 | Ahmed et al. | |
| 2007/0230482 A1* | 10/2007 | Shim | H04L 45/02 |
| | | | 370/400 |
| 2008/0082628 A1 | 4/2008 | Rowstron et al. | |
| 2008/0133582 A1 | 6/2008 | Andersch et al. | |
| 2008/0258880 A1* | 10/2008 | Smith | H04L 67/125 |
| | | | 340/286.02 |
| 2008/0263031 A1 | 10/2008 | George et al. | |
| 2008/0288646 A1 | 11/2008 | Hasha et al. | |
| 2009/0125639 A1 | 5/2009 | Dam et al. | |
| 2009/0271360 A1* | 10/2009 | Bestgen | G06F 16/24542 |
| 2009/0319503 A1 | 12/2009 | Mehul et al. | |
| 2009/0328115 A1* | 12/2009 | Malik | H04N 21/2393 |
| | | | 725/93 |
| 2010/0070570 A1* | 3/2010 | Lepeska | H04L 67/2857 |
| | | | 709/203 |
| 2010/0085948 A1 | 4/2010 | Yu et al. | |
| 2010/0094862 A1* | 4/2010 | Bent | G06F 16/2471 |
| | | | 707/716 |
| 2010/0296416 A1* | 11/2010 | Lee | H04L 12/4637 |
| | | | 370/258 |
| 2010/0306252 A1 | 12/2010 | Jarvis et al. | |
| 2011/0231431 A1 | 9/2011 | Kamiwada et al. | |
| 2011/0271319 A1 | 11/2011 | Venable, Sr. | |
| 2012/0269096 A1* | 10/2012 | Roskind | H04L 43/10 |
| | | | 370/255 |
| 2013/0110931 A1 | 5/2013 | Kim et al. | |
| 2013/0170336 A1 | 7/2013 | Chen et al. | |
| 2013/0276053 A1 | 10/2013 | Hugard, IV et al. | |
| 2014/0075505 A1* | 3/2014 | Subramanian | H04L 63/18 |
| | | | 726/3 |
| 2014/0101133 A1* | 4/2014 | Carston | G06F 16/24545 |
| | | | 707/718 |
| 2014/0149557 A1 | 5/2014 | Lohmar et al. | |
| 2014/0164552 A1* | 6/2014 | Kim | H04L 67/2842 |
| | | | 709/214 |
| 2014/0181295 A1 | 6/2014 | Hindawi et al. | |
| 2014/0244727 A1 | 8/2014 | Kang et al. | |
| 2014/0280280 A1* | 9/2014 | Singh | G06F 16/24545 |
| | | | 707/759 |
| 2014/0375528 A1 | 12/2014 | Ling | |
| 2015/0080039 A1 | 3/2015 | Ling et al. | |
| 2015/0149624 A1 | 5/2015 | Hindawi et al. | |
| 2015/0163121 A1* | 6/2015 | Mahaffey | H04L 63/1425 |
| | | | 707/687 |
| 2015/0172228 A1 | 6/2015 | Zalepa et al. | |
| 2015/0256575 A1* | 9/2015 | Scott | G06Q 20/145 |
| | | | 705/40 |
| 2015/0372911 A1 | 12/2015 | Yabusaki et al. | |
| 2015/0373043 A1* | 12/2015 | Wang | G06F 21/552 |
| | | | 706/12 |
| 2016/0080408 A1* | 3/2016 | Coleman | G06F 21/577 |
| | | | 726/22 |
| 2016/0119251 A1 | 4/2016 | Solis et al. | |
| 2016/0269434 A1* | 9/2016 | DiValentin | H04L 63/1408 |
| 2016/0286540 A1 | 9/2016 | Hindawi et al. | |
| 2016/0352588 A1 | 12/2016 | Subbarayan et al. | |
| 2016/0360006 A1* | 12/2016 | Hopkins | H04L 67/34 |
| 2017/0118074 A1 | 4/2017 | Feinstein et al. | |
| 2018/0039486 A1 | 2/2018 | Kulkarni et al. | |
| 2018/0074796 A1 | 3/2018 | Alabes et al. | |
| 2018/0191747 A1* | 7/2018 | Nachenberg | H04L 63/20 |
| 2020/0053072 A1* | 2/2020 | Glozman | H04W 12/06 |

OTHER PUBLICATIONS

Jae Woo Lee et al., 0 to 10k in 20 seconds: Bootstrapping Large-Scale DHT networks, 2011 IEEE International Conference on Communications, Jun. 9, 2011, pp. 1-6.*

Hood, Proactive Network-Fault Detection, Sep. 1997, 9 pages.

(56) References Cited

OTHER PUBLICATIONS

Mongeau, D., et al., "Ensuring integrity of network inventory and configuration data," Telecommunications Network Strategy and Planning Symposium, Networks 2004, 11th International Vienna, Austria, Jun. 13-16, 2004, 6 pgs.

Rao et al., "Optimal Resource Placement in Structured Peer-to-Peer Networks," Jul. 2010, IEEE Transactions on Parallel and Distributed Systems, vol. 21, No. 7, 16 pgs.

Tanium Inc, International Search Report and Written Opinion, PCT/US2013/076971, dated Apr. 4, 2014, 17 pgs.

Tanium Inc, International Preliminary Report on Patentability, PCT/US2013/076971, dated Jun. 23, 2015, 14 pgs.

Tanium Inc, International Search Report and Written Opinion, PCT/US2014/067607, dated Feb. 18, 2015, 13 pgs.

Tanium Inc, International Preliminary Report on Patentability, PCT/US2014/067607, dated May 31, 2016, 10 pgs.

Tanium Inc, International Search Report and Written Opinion, PCT/US2015/020780, dated Jul. 2, 2015, 13 pgs.

Tanium Inc, International Preliminary Report on Patentability, PCT/US2015/020780, dated Sep. 27, 2016, 9 pgs.

Hindawi, Office Action, U.S. Appl. No. 15/702,617, dated Jun. 1, 2018, 37 pgs.

Hindawi, Final Office Action, U.S. Appl. No. 15/702,617, dated Dec. 27, 2018, 54 pgs.

Hunt, Office Action dated Oct. 4, 2018, U.S. Appl. No. 15/215,468, 13 pgs.

Hunt, Notice of Allowance dated Jan. 24, 2019, U.S. Appl. No. 15/215,468, 8 pgs.

Hunt, Notice of Allowance dated Apr. 1, 2019, U.S. Appl. No. 15/215,468, 8 pgs.

Hunt, Office Action dated Sep. 10, 2018, U.S. Appl. No. 15/215,474, 10 pgs.

Hunt, Final Office Action dated Apr. 1, 2019, U.S. Appl. No. 15/215,474, 7 pgs.

Hunt, Notice of Allowance, U.S. Appl. No. 15/713,518, dated Apr. 10, 2019, 14 pgs.

Lippincott, Notice of Allowance, U.S. Appl. No. 15/878,286, dated Apr. 25, 2019, 9 pgs.

Jae Woo Lee, Henning Schulzrinne, Wolfgang Kellerer and Zoran Despotovic, 0 to 10k in 20 Seconds: Bootstrapping Large-Scale DHT Networks, pp. 1-6, Jun. 9, 2011 (Year: 2011).

Ion Stoica, Robert Morris, David Karger, M. Frans Kaashoek, Hari Balakrishnan, Chord: A Scalable Peertopeer Lookup Service for Internet Applications, 2001, pp. 1-12 (Year: 2002).

Ping Wang, Baber Aslann, Cliff C. Zou, Peer-to-Peer Botnets: The Next Generation of Botnet Attacks, Jan. 2010, pp. 1-25 (Year: 2010).

Sean Rhea, Dennis Geels, Timothy Roscoe, and John Kubiatowicz, Handling Churn in a DHT, 2004, pp. 1-14 (Year: 2004).

* cited by examiner

400

402 At a respective node in a network comprising a plurality of machines located at a non-static collection of nodes that form a linear communication orbit, perform a set of mapping operations comprising:

> 404 Maintain a local event database storing metadata for predefined events occurring at the respective node. The predefined events correspond to operations performed at the respective node.

406 Receive an application definition through the linear communication orbit. The application definition specifies criteria for establishing which nodes execute a specified application, a component of the specified application, or communicate with another node executing the specified application or a component of the specified application.

The application definition is sent by a server system coupled to the linear communication orbit and propagates from node to node along the linear communication orbit.

> 408 The application definition identifies at least one component (e.g., by file name) of the specified application and corresponding inbound or outbound ports for connection to or from the specified component.

410 Determine that the respective node performs one or more operations meeting the application definition, including identifying the one or more operations performed by the respective node that satisfy the application definition.

> 412 The one or more operations meeting the application definition include operations that are performed before the application definition is received at the respective node, such that the one or more operations and corresponding metadata associated with the one or more operations are retroactively identified in the local database according to the application definition.

414 In accordance with the determination that the respective node performs the one or more operations meeting the application definition, identify metadata associated with the one or more operation meeting the application definition (B)

At the respective node:

418 Maintain a mapping database configured to store information corresponding to a subset of data stored in the local event database 416 The mapping database having a size smaller than that of the local event database

422 Store in the mapping database the metadata, or information corresponding to the metadata, associated with the one or more operations performed by the respective node that meet the application definition 420 The information corresponding to the metadata stored in the mapping database includes one or more events summaries for the specified application, and for respective time periods in a sequence of time periods, each event summary includes a summary of one or more predefined characteristics of the one or more operations performed during the respective time period

450 The subset of the metadata included in the response by the respective node to the server includes a first subset of metadata associated with a first plurality of operations performed by the respective node that meet the application definition In response to the map request:

454 Receive a second subset of metadata associated with a second plurality of operations performed at a second node in the linear communication orbit.

The second node is distinct from the respective node.

The second plurality of operations meets the application definition.

456 Aggregate the first subset of metadata and the second subset of metadata.

The aggregated first and second subsets of metadata are returned to the server system via the linear communication orbit

At the server system, the server system is coupled to an administrator's machine :

462 Receive from the administrator's machine an application definition deployment instruction to deploy the application definition to the linear communication orbit.

The application definition deployment instruction includes the application definition and identifier(s) of one or more nodes in the linear communication orbit, including the respective node.

466 Receive from the administrator's machine a map instruction to send the map request to the linear communication orbit 464 The map request specifies the one or more filters

At the respective node:

470 Receive from the server system instructions for establishing a direct duplex connection between the respective node and a remote server.

↓

472 In response to receiving the instructions through the linear communication orbit:

send an outbound connection request to the server system to establish the direct duplex connection between the respective node and the remote server.

↓

473 Establish the direct duplex according to the instructions for establishing a direct duplex connection

↓

474 Receive an instruction from the server system to upload local data through the direct duplex connection.

The local data is related to operations performed at the respective node

↓

476 In response to the instruction, upload the local data to the remote server.

The server system is configured to perform analysis on the local context data received from the respective node

↓

478 Select one or more unknown processes and/or associated metadata and build an application definition including the selected one or more unknown processes

At a server system in a network comprising a plurality of machines located at a non-static collection of nodes that form a linear communication orbit, perform a set of mapping operations comprising:

502 Send an application definition through the linear communication orbit.

The application definition propagates from node to node along the linear communication orbit.

The application definition specifies criteria for establishing which nodes execute a specified application, a component of the specified application, or communicate with another node executing the specified application or a component of the specified application.

504 Send a map request through the linear communication orbit. The map request propagates from node to node along the linear communication orbit 510 In response to the map request, receiving from a first node of the linear communication orbit, via the linear communication orbit, information corresponding to at least a subset of metadata associated with one or more operations performed by the first node that meet the application definition.

The server system builds a map based on responses to the map request receoved from the first node and at least one other node in the network 512 After receiving the subset of metadata associated with the one or more operations performed by the first node that meet the application definition, build an application based map representing data communication between the first node and the at least one other node in association with the specified application (A)

514 In response to the map request: receive a response from a second node of the linear communication orbit, via the linear communication orbit.

The response includes information corresponding to at least a subset of metadata associated with one or more operations performed by the second node that meet the application definition 516 Build an application based map based on the responses to the map request by the first node and the second node in the linear communication orbit 518 The map includes information representing data communications between the first node and the second node in association with the specified application 520 After receiving the subset of metadata associated with the one or more operations performed by the respective node that meet the application definition, build an endpoint based map representing data connections with the first node in association with one or more applications including the specified application.

522 The application definition is a first application definition.

Send a second application definition through the linear communication orbit, wherein the second application definition propagates from node to node along the linear communication orbit, and specifies criteria for establishing which nodes execute a specified application, a component of the specified application, or communicate with another node executing the specified application or a component of the specified application.

524 In response to the map request, receive from the first node, via the linear communication orbit, information corresponding to at least a subset of metadata associated with one or more operations performed by the first node that meet the second application definition.

Figure 5B

MAPPING APPLICATION DEPENDENCIES IN A COMPUTER NETWORK

RELATED APPLICATIONS

This application claims priority to U.S. Provisional Patent Application No. 62/700,171, filed Jul. 18, 2018, which is hereby incorporated by reference in its entirety.

This application is also related to U.S. patent application Ser. No. 15/713,518, filed Sep. 22, 2017, titled "Integrity Monitoring in a Local Network;" U.S. patent application Ser. No. 15/215,483, filed Jul. 20, 2016, titled "System and Method for Performing Event Inquiries in a Network," and U.S. patent application Ser. No. 15/215,474, filed Jul. 20, 2016, titled "System and Method for Performing Event Inquiries in a Network," both of which claim the benefit of U.S. Provisional Application Ser. No. 62/333,768, filed May 9, 2016, titled "System and Method for Performing Event Inquiries in a Network;" and U.S. Provisional Patent Application Ser. No. 62/305,482, filed Mar. 8, 2016, titled "Cost Prioritized Evaluations of Indicators of Compromise;" U.S. patent application Ser. No. 13/797,946, filed Mar. 12, 2013, now U.S. Pat. No. 9,246,977, titled "System, Security and Network Management Using Self-Organizing Communication Orbits in Distributed Networks;" U.S. patent application Ser. No. 12/412,623, filed Mar. 27, 2009, now U.S. Pat. No. 8,086,729, titled "Distributed Statistical Detection of Network Problems and Causes;" U.S. patent application Ser. No. 13/084,923, filed Apr. 12, 2011, now U.S. Pat. No. 8,904,039, titled "Large-Scale Network Querying and Reporting;" U.S. patent application Ser. No. 13/107,625, filed May 13, 2011, now U.S. Pat. No. 8,903,973, titled "Parallel Distributed Network Management;" U.S. patent application Ser. No. 14/553,769, filed Nov. 25, 2014, now U.S. Pat. No. 9,769,037, titled "Fast Detection and Remediation of Unmanaged Assets;" U.S. patent application Ser. No. 14/554,739, filed Nov. 26, 2014, now U.S. Pat. No. 9,769,275, titled "Data Caching and Distribution in a Local Network;" and U.S. patent application Ser. No. 15/136,790, now U.S. Pat. No. 9,910,752, filed Apr. 22, 2016, titled "Reliable Map-Reduce Communications in a Decentralized, Self-Organizing Communication Orbit of a Distributed Network." Content of each of the above applications is hereby incorporated by reference in its entirety. The above applications are also referred to hereafter as "the Related Applications" or "the Incorporated Disclosure."

TECHNICAL FIELD

The present disclosure relates to discovering and mapping dependencies between applications and application components in computer networks.

BACKGROUND

Modern Information Technology (IT) infrastructures are complex and dynamic. Establishing and tracking how computer components such as servers, networks, storage, and applications in a given computer network are interconnected is a challenge. The process of establishing and tacking computer components in a computer network is sometimes referred to as application dependency mapping. Application dependency maps are needed for investigation of and responses to application outages (e.g., discovering what applications are expected to be online and running), prevention of application incidents (e.g., accidently taking a productive application offline), optimization of application infrastructure (e.g., identifying single points of failures, insufficient capacity of nodes in a network, redundancy of running servers, etc.), managing and restricting access to nodes in a computer network, etc.

Some conventional approaches to application dependency mapping are manual. Manual mapping is typically performed by application owners and architects using software tools such as Visio (a trademark of Microsoft Inc.). Manual mapping is often prone to errors, performed ad hoc in response to incidents, and is labor-intensive. Such manual maps are often outdated because changes in the computer network occur more frequently than updates of the map. Manual mapping is sometimes combined with mapping that is based on data collected by network-scanning software tools. Those tools typically work by periodically probing a network to establish how nodes in the network are communicating. One drawback of the network-scanning approach is that a significant library of login credentials needs to be maintained, usually by a server, to get access to relevant connection data of each node in the network. Another drawback is that it could place a significant load on the network and negatively impact its performance. For that reason, the network scans are sometimes scheduled for a time period in which low usage of the network is expected. That approach, however, leads to the collection of data that is not representative of usual traffic in the network. Therefore, conventional approaches create inaccurate maps as a result of human errors or lack of access to reliable data, place a computational burden on the network, and/or are labor intensive.

SUMMARY

Accordingly, there is a need within the realm of network mapping techniques, to provide for a mechanism that produces accurate maps without unduly burdening the network.

Other embodiments and advantages may be apparent to those skilled in the art in light of the descriptions and drawings in this specification.

(A1) In some embodiments, a method of mapping a network that includes a plurality of machines located at a non-static collection of nodes that form a linear communication orbit, includes a set of mapping operations performed at a respective node in the linear communication orbit, wherein each node in the linear communication orbit includes a machine identifier for a respective machine, of the plurality of machines, at the node, and the nodes have self-organized into an ordered sequence in accordance with a predefined order of the respective machine identifiers of the non-static collection of nodes in the linear communication orbit. The set of mapping operations includes: receiving an application definition through the linear communication orbit, wherein the application definition is sent by a server system coupled to the linear communication orbit, and propagates from node to node along the linear communication orbit, and the application definition specifies criteria for establishing which nodes execute a specified application, a component of the specified application, or communicate with another node executing the specified application or a component of the specified application.

The set of mapping operations further includes: determining that the respective node performs one or more operations meeting the application definition, including identifying the one or more operations by the respective node that satisfy the application definition; in accordance with the determination that the respective node performs the one or more operations meeting the application definition, identifying metadata associated with the one or more operations performed by the node that meet the application definition; receiving a map request through the linear communication orbit, wherein the map request is sent by the server system, and propagates from node to node along the linear communication orbit until reaching the respective node; and in response to the map request, responding to the server system through the linear communication orbit by sending information corresponding to at least a subset of the metadata associated with the one or more operations performed by the respective node that meet the application definition, the sent information enabling the server to build a map based on responses to the map request by the respective node and at least one other node in the network.

(A2) In some embodiments of the method of A1, the subset of the metadata includes a first subset of metadata associated with a first plurality of operations performed by the respective node that meet the application definition, and the method further includes, at the respective node, in response to the map request: receiving a second subset of metadata associated with a second plurality of operations performed at a second node in the linear communication orbit, the second node being distinct from the respective node, the second plurality of operations meeting the application definition; and aggregating the first subset of metadata associated with the first plurality of operations performed at the respective node and the second subset of metadata associated with the second plurality of operations performed at the second node, wherein the aggregated first and second subsets of metadata are returned to the server system via the linear communication orbit.

(A3) In some embodiments, the method of A1 or A2, further includes storing in a mapping database at the respective node the metadata, or information corresponding to the metadata, associated with the one or more operations performed by the respective node that meet the application definition; and, in response to the map request, identifying in the mapping database the subset of the metadata associated with the one or more operations performed by the respective node that meet the application definition, and sending to the server system the identified subset of the metadata associated with the one or more operations performed by the respective node that meet the application definition.

(A4) In some embodiments of the method of A1 or A2, the respective node includes a local event database storing metadata for predefined events occurring at the respective node, corresponding to operations performed at the respective node, and the plurality of operations performed at the respective node includes the one or more operations that satisfy the application definition.

(A5) In some embodiments, the method of A4 further includes storing in a mapping database the metadata associated with the one or more operations performed by the respective node that meet the application definition, the mapping database being configured to store information corresponding to a subset of data stored in the local database and having a size smaller than that of the local database.

(A6) In some embodiments of the method of any of A1-A5, the one or more operations meeting the application definition include operations performed before the application definition is received at the respective node through the linear communication orbit, such that the one or more operations and the corresponding metadata associated with the one or more operations are retroactively identified according to the application definition.

(A7) In some embodiments of the method of any of A1-A5, the one or more operations meeting the application definition include a first subset of operations performed before the application definition is received at the respective node through the linear communication orbit, and a second subset of operations performed after the application definition is received at the respective node through the linear communication orbit.

(A8) In some embodiments of the method of any of A1-A7, the map request includes one or more filters specifying at least one of a time range, a number of connections, a frequency of connection, and a duration of connection with respect to the one or more operations performed by the respective node that meet the application definition; and the method further includes, in response to the map request, identifying the subset of the metadata associated with the one or more operations performed by the respective node that meet the application definition in accordance with the one or more filters.

(A9) In some embodiments of the method of A8, the one or more filters further specify a computer group according to at least one machine characteristic, and the respective node has the at least one machine characteristic and the computer group includes the respective node.

(A10) In some embodiments of the method of A8, the server system is coupled to an administrator machine, and the method further includes, at the server system, receiving from the administrator machine a map instruction to send the map request to the linear communication orbit, wherein the map instruction specifies the one or more filters.

(A11) In some embodiments of the method of any of A1-A10, responding to the server system further includes sending to the server system at least one of: an IP address of the respective node, information identifying a user associated with the one or more operations meeting the application definition, a location of the respective node, a time zone of the respective node, and a chassis type of the respective node.

(A12) In some embodiments of the method of any of A1-A11, the sent information corresponding to the at least a subset of the metadata associated with the one or more operations includes a link to the at least a subset of the metadata associated with the one or more operations.

(A13) In some embodiments of the method of any of A1-A11, the sent information corresponding to at least a subset of the metadata associated with the one or more operations includes metadata associated with a subset of the one or more operations performed by the respective node that meet the application definition.

(A14) In some embodiments of the method of any of A1-A13, the server system is coupled to an administrator machine, and the method further includes, at the server system, receiving from the administrator machine an application definition deployment instruction to deploy the application definition to a first subset of nodes in the linear communication orbit, the application definition deployment instruction includes the application definition and identifiers of the first subset of nodes including the respective node.

(A15) In some embodiments of the method of any of A1-A14, the map request is received periodically from the server system according to a predetermined schedule.

(A16) In some embodiments of the method of any of A1-A15, the method further includes: receiving from the server system a direct communication instruction for establishing a direct duplex connection between the respective node and a remote server; in response to receiving the direct communication instruction through the linear communication orbit, sending an outbound connection request to the remote server to establish the direct duplex connection between the respective node and the remote server; and uploading local context data related to the one or more operations to the remote server through the direct duplex connection, wherein the remote server is configured to perform analysis on the local context data received from the respective node to investigate one of the one or more operations performed at the respective node that meet the application definition.

(A17) In some embodiments of the method of A16, the direct duplex connection is a secure websocket connection.

(A18) In some embodiments of the method of any of A1-A17, the method further includes: at the server system, after receiving the subset of metadata associated with the one or more operations performed by the respective node that meet the application definition, identifying the one of the one or more operations as an operation of interest by filtering the subset of metadata according to a map criterion.

(A19) In some embodiments of the method of any of A1-A18, the at least one other node is located at the linear communication orbit.

(A20) In some embodiments of the method of any of A1-A19, the linear communication orbit is a first linear communication orbit coupled to the server system, and the at least one other node is located at a second linear communication orbit coupled to the server system, the second linear communication orbit being distinct from the first linear communication orbit.

(A21) In some embodiments of the method of any of A1-A20, the application definition identifies at least one executable file corresponding to one or more components of the specified application and at least one of inbound or outbound port for connection to or from the specified component.

(A22) In another aspect, in some embodiments, a computational machine for mapping a network comprising a plurality of machines located at a non-static collection of nodes that form a linear communication orbit, includes one or more processors and memory having instructions stored thereon, which when executed by the one or more processors cause the computational machine to perform a set of mapping operations, including, at a respective node in the linear communication orbit, wherein each node in the linear communication orbit includes a machine identifier for a respective machine, of the plurality of machines, at the node, and the plurality of nodes have self-organized into an ordered sequence in accordance with a predefined order of the respective machine identifiers of the non-static collection of nodes in the linear communication orbit, implementing the method of any of A1-A21.

(A22) In another aspect, in some embodiments, a non-transitory computer readable storage medium storing one or more programs configured for execution by a computational machine for mapping a network comprising a plurality of machines located at a non-static collection of nodes that form a linear communication orbit, the one or more programs comprising instructions for: at a respective node in the linear communication orbit, wherein each node in the linear communication orbit includes a machine identifier for a respective machine, of the plurality of machines, at the node, and the plurality of nodes have self-organized into an ordered sequence in accordance with a predefined order of the respective machine identifiers of the non-static collection of nodes in the linear communication orbit, implementing the method of any of A1-A21.

(A23) In some embodiments, a method mapping a network comprising a plurality of machines located at a non-static collection of nodes that form a linear communication orbit includes: at a server system coupled to the linear communication orbit, wherein each node in the linear communication orbit includes a machine identifier for a respective machine, of the plurality of machines, at the node, and the plurality of nodes have self-organized into an ordered sequence in accordance with a predefined order of the respective machine identifiers of the non-static collection of nodes in the linear communication orbit, performing a set of mapping operations. The set of mapping operations includes: sending an application definition through the linear communication orbit, wherein the application definition propagates from node to node along the linear communication orbit, and specifies criteria for establishing which nodes execute a specified application, a component of the specified application, or communicate with another node executing the specified application or a component of the specified application. The set of mapping operations further includes: sending a map request through the linear communication orbit, wherein the map request propagates from node to node along the linear communication orbit; and in response to the map request, receiving from a first node of the linear communication orbit, via the linear communication orbit, information corresponding to at least a subset of metadata associated with one or more operations performed by the first node that meet the application definition, the sent information enabling the server to build a map based on responses to the map request by the first node and at least one other node in the network.

(A25) In some embodiments, the method of A24 further includes: after receiving the subset of metadata associated with the one or more operations performed by the first node that meet the application definition, building an application based map representing data communication between the first node and the at least one other node in association with the specified application.

(A26) In some embodiments, the method of A24 further includes: in response to the map request, receiving from a second node of the linear communication orbit, via the linear communication orbit, information corresponding to at least a subset of metadata associated with one or more operations performed by the second node that meet the application definition; and building an application based map based on the responses to the map request by the first node and the second node in the linear communication orbit.

(A27) In some embodiments of the method of A26, the map includes information representing data communications between the first and the second node in association with the specified application.

(A28) In some embodiments, the method of A24 further includes: after receiving the subset of metadata associated with the one or more operations performed by the respective node that meet the application definition, building an endpoint based map representing data connections with the first node in association with one or more applications including the specified application.

(A29) In some embodiments of the method of A24, the application definition is a first application definition and the specified application is a first specified application, and the method further includes: sending a second application definition through the linear communication orbit, wherein the second application definition propagates from node to node along the linear communication orbit, and specifies criteria for establishing which nodes execute a second specified application, a component of the second specified application, or communicate with another node executing the second specified application or a component of the second specified application; and in response to the map request, receiving from the first node, via the linear communication orbit, information corresponding to at least a subset of metadata associated with one or more operations performed by the first node that meet the second application definition.

BRIEF DESCRIPTION OF THE DRAWINGS

FIGS. 4A-4F are a flow chart of a method for mapping a network (e.g., managed network 100, FIG. 1A-1B), e.g., for building an application based map, in accordance with some embodiments. In some embodiments, the method illustrated in 4A-4F is performed by a node in a network.

FIGS. 5A-5B are a flow chart of a method for mapping a network (e.g., managed network 100, FIG. 1A-1B), e.g., for building an application based map, in accordance with some embodiments. In some embodiments, the method illustrated in FIGS. 5A-5B is performed by a server in the network, or by a remote server.

Like reference numerals refer to corresponding parts throughout the drawings.

DESCRIPTION OF EMBODIMENTS

Figure 1A:
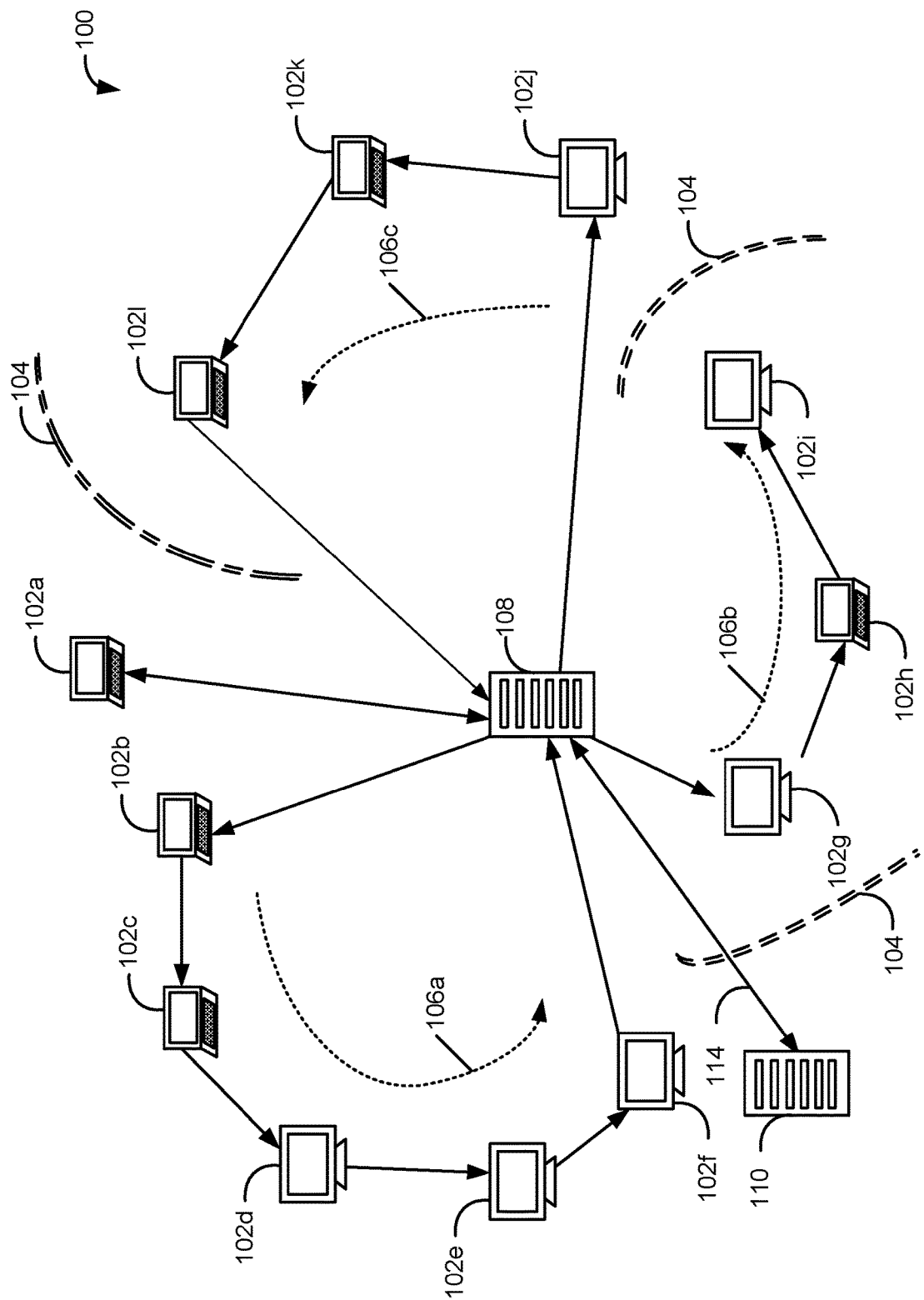
FIGS. 1A-1B illustrate a computer network organized into linear communication orbits, in accordance with some embodiments.

Some methods and devices described in the present specification improve upon application mapping methods by determining whether individual client nodes of an established linear communication orbit 106 (shown in FIGS. 1A and 1B) perform operations meeting an application definition. An application definition specifies criteria for establishing which nodes execute a specified application, a component of the specified application, or communicate with another node executing the specified application or a component of the specified application. An example of an application definition is shown in FIG. 2. The nodes are located at different computational machines 102 shown in FIGS. 1A and 1B. Such determination is not limited by a specific schedule, and can be implemented in real-time and without interruption at the individual computational nodes.

In a typical scenario, a server system sends the application definition, for example in a communication conveyed through linear communication orbit 106, to one or more nodes in linear communication orbit 106. Typically, the application definition is conveyed to all the nodes in a linear communication orbit, or all the nodes meeting matching criteria (sometimes called filter criteria) (e.g., all nodes in the linear communication orbit that execute a particular computer operating system, but other matching criteria may be specified in various embodiments) specified by the communication (e.g., a message) that conveys the application definition. Upon receiving the application definition, a respective node determines whether the node performs one or more operations meeting the application definition. If the respective node performs such operations, the node identifies the operations and corresponding metadata associated with those operations. In accordance with some embodiments, the respective node stores the metadata for the identified operations in a mapping database. The mapping database is located at the respective node. While continuously monitoring the operations performed locally at the node according to the application definition, the respective node waits to receive a map request from the server system. In response to receiving a map request, the respective node returns metadata, or summaries of or information about the metadata, for at least some of the identified operations that meet the application definition in accordance with the map request.

After receiving the application definition, unless the respective node is an end node of the linear communication orbit, the respective node forwards the application definition to a next node in the linear communication orbit. In this way, the application definition is typically conveyed to all nodes in the linear communication orbit. The respective node forwards the application definition to the next node before, after, or while the respective node determines whether the respective node performs operations meeting the application definition. Thus, the process of establishing which nodes in a linear communication orbit execute a specified application is distributed among the nodes in the linear communication orbit, thereby reducing the overall load on a managed network. It would be appreciated that the expression "execute a specified application" throughout this disclosure is intended to broadly encompass execution of a specified application, a component of the specified application, or communicate with another node executing the specified application or a component of the specified application.

Linear communication orbits are described below with reference to FIG. 1A. FIG. 1B illustrates a schematic diagram of a direct duplex connection between a node in a linear communication orbit and a remote server (e.g., investigating server 110, FIG. 1B). Since application definitions are referenced throughout this document, FIG. 2 provide details concerning application definitions. Methods for mapping a network are described with reference to FIGS. 4A-4F (method 400), and FIGS. 5A-5B (method 500). FIGS. 6-9 are block diagrams of machines in a network or machines interacting with a network (e.g., a node, an administrator's device, a server of a network, and a remote investigating server).

Figure 1B:
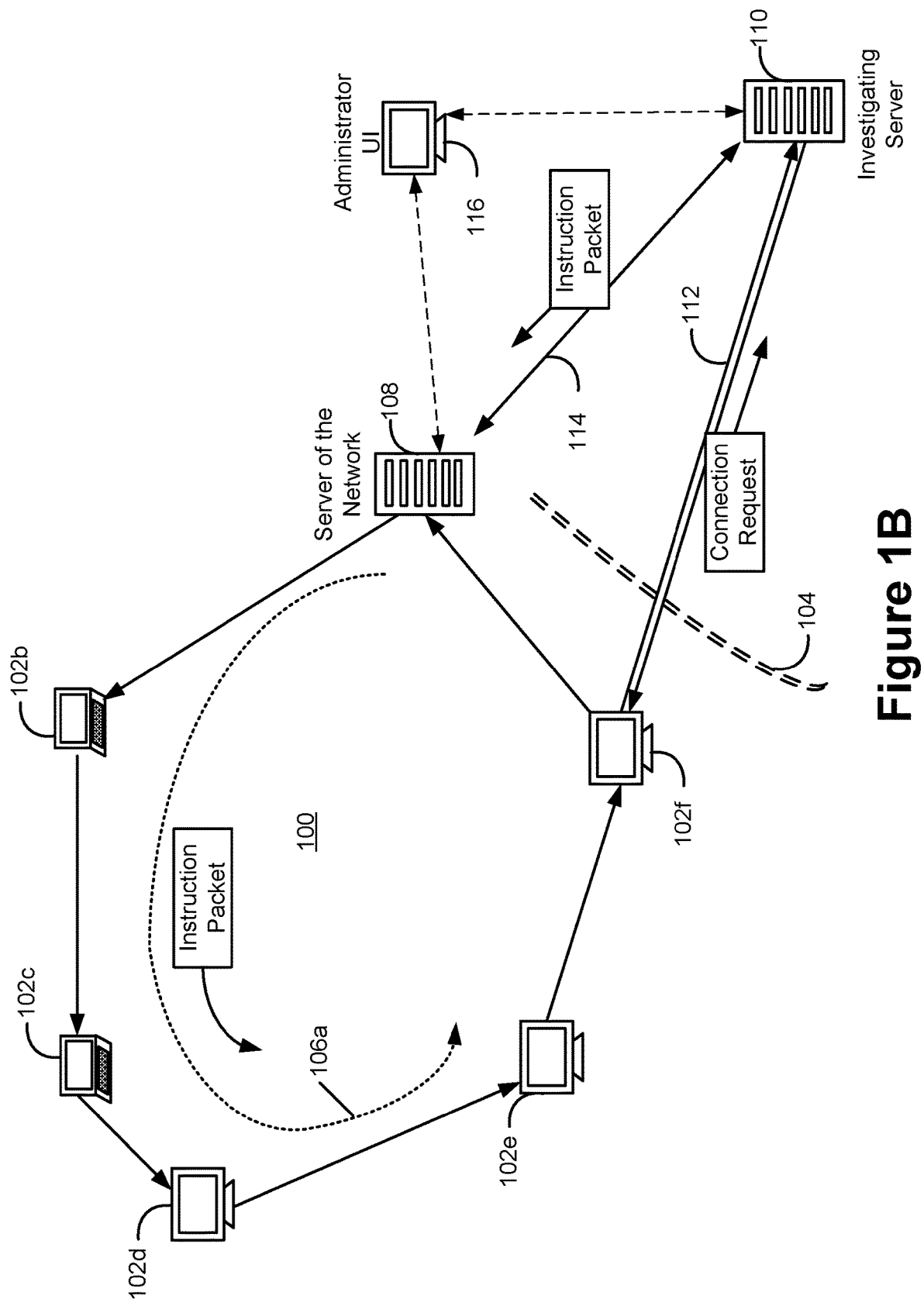
Figure 2:
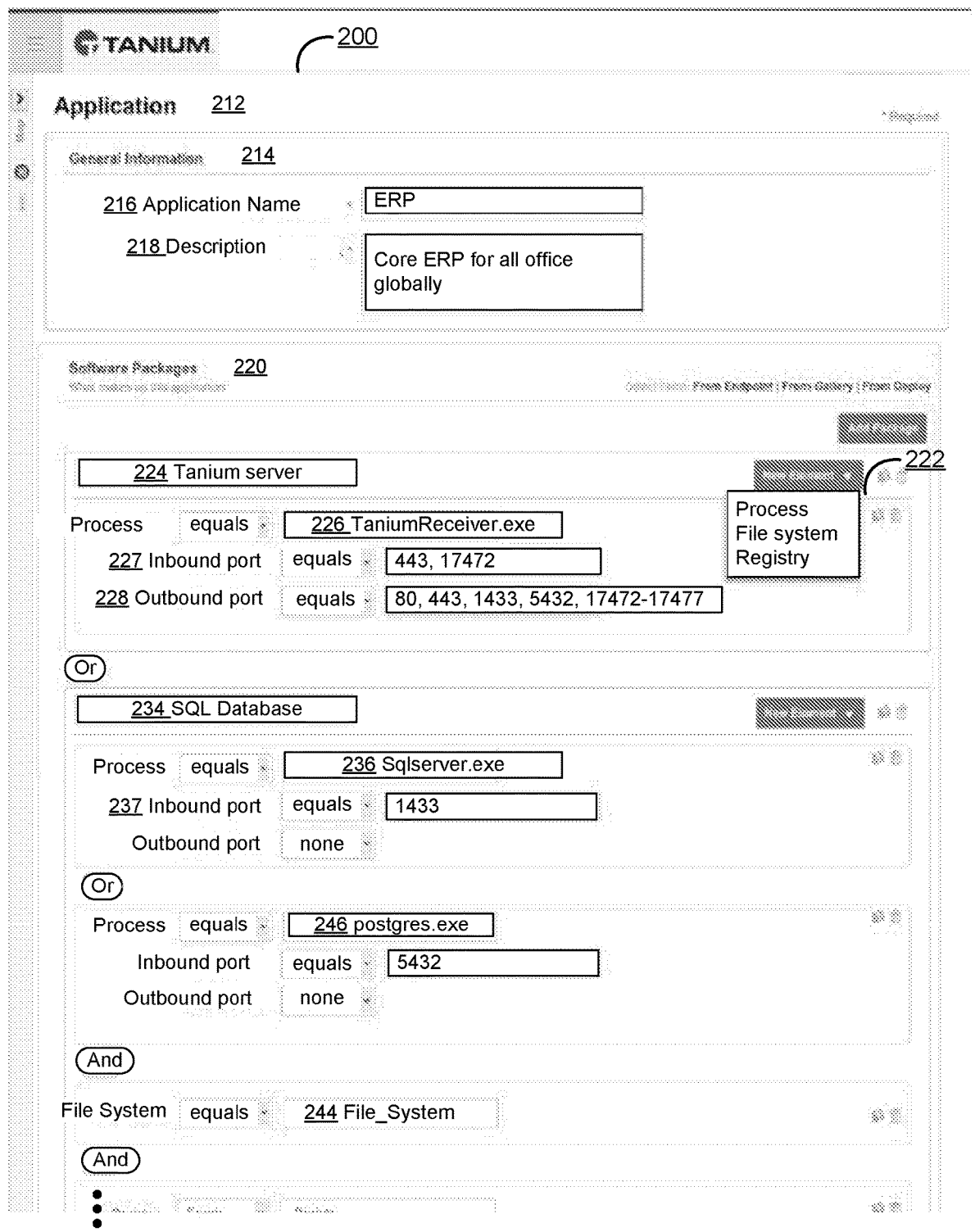
FIG. 2 illustrates an example of a user interface for building application definitions, in accordance with some embodiments.

FIG. 1A illustrates a computer network organized into linear communication orbits, in accordance with some embodiments. More specifically, FIG. 1A illustrates a managed network 100 comprising a plurality of interconnected machines or nodes 102 (including 102a-1), e.g., computers, servers, mobile devices, and other networked devices that are arranged into one or more linear communication orbits. It would be appreciated that the terms "machine" and "node" throughout this disclosure are used interchangeably. In some embodiments, the application mapping methods described herein are performed at one or more nodes (e.g., node 102, see FIGS. 1A and 1B) of a linear communication orbit. In some embodiments, the methods described herein are performed, at least in part, at a remote server (e.g., investigating server 110) that is not part of network 100 and is optionally separated from network 100 by a firewall 104, see FIGS. 1A and 1B). In some embodiments, the methods described herein are performed at an administrator's machine 116 (e.g., a computer system or computer implemented device, as discussed below with reference to FIG. 7) that interacts with one or more nodes 102 through server 108 of the network and/or remote server 110, see FIG. 1B).

The linear communication orbit structure shown in FIG. 1A is an alternative to the conventional hub-and-spoke or hierarchical architecture for managed networks. However, in some embodiments, the application mapping methods described herein are performed at one or more nodes/servers of a hub-and-spoke network, where a remote server, or a server in the network sends the application definition to a respective node through the server of the hub-and-spoke network or the top node of hierarchical architecture, and allow the respective node to determine whether the respective nodes perform operations meeting an application definition. However, in such cases, the benefit and efficiency of the linear communication orbit may be lost.

Examples of managed network 100 include enterprise networks or other networks under common management. In some embodiments, at least some of machines or nodes 102 coupled to managed network 100 are distributed across different geographical areas and/or localized at the same physical location. In some embodiments, machines or nodes 102 coupled to managed network 100 are divided into several sub-networks separated by one or more firewalls 104. In some embodiments, the network 100 is separated from external networks by one or more firewalls 104.

In some embodiments, machines or nodes 102 currently coupled to network 100 are self-organized into one or more contiguous segments 106 of a single linear communication orbit. In some embodiments, each contiguous segment 106 constitutes a respective linear communication orbit.

In some embodiments, managed network 100 also includes server 108 that facilitates the creation and maintenance of the one or more contiguous segments 106. The server 108 may be relatively lightweight, and may be elected from nodes 102 in the network.

In some embodiments, as shown in FIG. 1A, the linear communication orbit linking all of the nodes coupled to network 100 includes a respective communication channel between each pair of adjacent nodes in an ordered sequence of all nodes 102 in network 100. In some embodiments, communication between a pair of adjacent nodes 102 (e.g., machine 102g and machine 102f) across a firewall 104 may need to be bridged by an intermediate server (e.g., server 108).

An important feature of linear communication orbit(s) 106 is that, in some embodiments, they are automatically formed without global, continuous, and/or active intervention by any network administrative program or personnel. Each node 102 joining network 100 is equipped with (or provided with) a set of predetermined rules. According to the set of predetermined rules, each node 102 finds its immediate neighbor nodes and coordinates with these immediate neighbor nodes to self-organize into a local segment of the linear communication orbit. The local segments of adjacent nodes overlap and fuse into a contiguous segment of the linear communication orbit. In some embodiments, the linear communication orbit grows or contracts as nodes join and leave network 100 (e.g., the network is non-static), through the independent local actions of the nodes in network 100, without global, continuous, and/or active intervention by any network administrative programs or personnel. Although all nodes 102 implement the same set of rules, and each node directly interacts only with its immediate neighbor nodes to facilitate the formation of the orbit, the rules are designed in a way that cause the machines' independent local actions to be globally consistent and to result in self-organization and automatic repair and maintenance of linear communication orbit(s) 106.

In some embodiments, all nodes 102 coupled to network 100 are sorted into an ordered sequence according to a respective unique identifier associated with each machine or node 102. These identifiers are also referred to as the addresses of the machines or nodes in the network. For example, in some embodiments, respective IP addresses of nodes 102 are used as the identifiers to sort the machines into an ordered sequence. In some embodiments, the nodes are sorted according to decreasing IP address values, an upstream direction of the linear communication orbit is the direction of increasing IP address values, and a downstream direction of the linear communication orbit is the direction of decreasing IP address values. In some embodiments, the nodes are sorted according to increasing IP address values, an upstream direction of the linear communication orbit is the direction of decreasing IP address values, and a downstream direction of the linear communication orbit is the direction of increasing IP address values.

In some embodiments, other types of unique identifiers or addresses may be used. For each type of unique identifier or address, the set of predetermined rules provides a deterministic way of sorting the unique identifiers or addresses of that type into an ordered sequence. Given the identifiers or addresses of two nodes in the network, the relative order of the two nodes and their distances in the linear communication orbit (also referred to as an interval between the two machines or nodes) can be determined. In some embodiments, not all possible addresses are occupied by a corresponding node in the network.

In some embodiments, each node 102 receiving a communication message (e.g., an application definition, a map request, a query message including a question part and an answer part (sometimes called a query portion and an answer portion or response portion), etc.) from its upstream neighbor node acts upon the message by providing an update to the message based on its local state or information, performing some aggregation of the information in the message (e.g., by adding to or modifying aggregated results already included in the message as received from its upstream neighbor), executing instructions included in the message, performing determinations according to criteria specified in the message, and/or forwarding the message to its downstream neighbor node along the linear communication orbit. Essentially, each machine or node expends a small amount of resources to take on a small part of the duties of data aggregation without being overly burdened. In the application mapping scenario, in some embodiments, the message may include an application definition. In such case, a node acts upon the message by, optionally storing the application definition locally, and determining a number of operations performed by the respective node that meet the criteria specified in the application definition. In some embodiments, the node stores in a local mapping database metadata, or information corresponding to the metadata, associated with the one or more operations performed by the respective node that meet the application definition. In some embodiments, a map request may be included in communication message and propagated along the linear communication orbit (see FIG. 1A) or through a direct duplex connection (see FIG. 1B). The map request may include a query part that is configured to extract data associated with a specified application from the mapping database. In some embodiments, the map request may include a query part that is configured to extract data associated with a specified node from a mapping database located at the specified node. More details on how the messages are propagated to and collected from nodes or machines 102 in network 100 through linear communication orbit(s) 106 are provided in the Incorporated Disclosure.

In some embodiments, each node implements a set of common rules such that each node in the linear communication orbit knows what to do with respect to each query it receives or knows about, without requiring excessive back and forth interactive communications between the nodes themselves or between the nodes and the central management of a server or administrator. This set of common rules is different from the set of common rules for establishing and maintaining the linear communication orbit as described in the Incorporated Disclosure, and can be used in addition to the set of common rules for establishing and maintaining the linear communication orbit.

An advantage of message communication over the linear communication orbit is that queries, answers, and/or instructions regarding a specified application or a specified node can be quickly passed to and from a node 102 or server 108 without excessive communication and computational overhead.

In some embodiments, server 108 (or a remote server 110 in communication with server 108) propagates an application definition through linear communication orbit(s) 106, and then propagates a map request through the linear communication orbit(s) 106. The application definition may be generated by server 108, a remote server 110, or an administrator's machine 116 (see FIG. 1B). Similarly, the map request may be generated by server 108, a remote server 110, or an administrator's machine 116. In some embodiments, the map request is for extracting information about whether nodes 102 in network 100 execute a specified application. The information is to be extracted from mapping databases located at each node 102. In some embodiments, the server determines the order, frequency, and/or priority by which the application definitions or map requests should be injected in the linear communication orbit(s) 106. In some embodiments, the server sends out a map request according to a predetermined schedule, e.g., every hour. Thus, a map for a specified application may be updated every hour according to the predetermined schedule. The application definition includes the criteria that individual nodes use to locally evaluate whether a respective node executes a specified application. The individual nodes perform local evaluation in accordance with the criteria set in the application definition, and each individual node sends results back to server 108 through the linear communication orbit 106 that includes that node.

In some embodiments, server 108 sends the results (e.g., sends an aggregated response) to remote server 110. In some embodiments, server 108/110 determines whether an application on a specified node is still up and running, and in some embodiments, if the application is not running, server 108/110 automatically sends out instructions for one or more remedial actions to be carried out at the affected node(s) (e.g., restarting of affected nodes, redirecting of communication, etc.). In some embodiments, remote server 110 communicates with server 108 via a secure connection 114. In some embodiments, when remote server 110 needs to send a message to a particular node in the network and a direct connection between remote server 110 and the particular node does not already exist, remote server 110 optionally sends the message to server 108 and has server 108 forwards the message to the particular node along the linear communication orbit. In some embodiments, remote server 110 starts a network-wide information gathering process by sending a series of map requests or application definitions to server 108 (or a starting node of the linear communication orbit), allowing server 108 (or the starting node) to propagate the map requests or application definitions into the network along the linear communication orbit, and receiving the answers or evaluation results (e.g., individual answers, aggregated answers, and/or metrics and statistics computed based on the answers or evaluation results collected from the nodes in the network) from server 108 (or an end node of the linear communication orbit).

The lightweight, decentralized mechanism (e.g., the set of common action rules observed by the nodes in the network) allows the nodes in the network to self-organize into one or more linear communication orbits, and allows the linear communication orbits to recover/self-heal from broken links and slow connections (e.g., by temporarily bypassing the unresponsive nodes) without active administrative intervention. The self-organization and self-healing aspects of the linear communication orbits ensure that communication and data collection bottlenecks are quickly discovered and eliminated, without causing much observable impact on the communication and data collection speed. In addition, when collecting data along the linear communication orbits, the server may inject queries regarding different aspects of the nodes in separate messages, and the messages may be propagated down the linear communication orbit, processed in parallel at the nodes, and answered by as many nodes as possible (e.g., nodes that satisfy per matching criteria specified by the messages), without being held up by any slow responding nodes. In fact, communication with and data collection from any and all nodes in the network (e.g., enterprise networks with thousands or millions of nodes) may be accomplished in substantially real-time (e.g., a matter of seconds), as opposed to taking days and weeks in a network with a conventional hierarchical or hub-and-spoke configuration. For example, messages are delivered to the nodes at the speed at which messages are propagated through the linear communication orbit, and the processing of the queries at the nodes occurs after receiving the messages, in parallel at the nodes. In some embodiments, answers to the queries are collected in a subsequent traversal of the linear communication orbit by either the original messages (propagating in the reverse direction) or by subsequent "answer collection" messages.

FIG. 1B illustrates that, in some embodiments, remote server 110 (sometimes herein called an investigating server) communicates (e.g., sends messages and/or queries) directly with a respective node (e.g., node 102f) over direct duplex connection 112 (e.g., a WebSocket connection). Various methods are provided herein for establishing direct duplex connections between remote server 110 and nodes 102 in a linear communication orbit (e.g., as described with reference to method 400, FIG. 4F). Direct duplex connection 112 is particularly useful when a remote server needs to take a deep-dive into a respective node in the network (e.g., to carry out frequent back and forth interactions and/or to transfer large amount of local event data and/or deploy a security patch), rather than investigating the network at-large. The messages and/or queries can be analogous to those described above, but they are sent directly to the respective node via direct duplex connection 112 (rather than being propagated through linear communication orbit 106a), and without the communication needing to be bridged by server 108. In some embodiments, remote server 110 can communicate with the respective node either through direct duplex connection 112 (e.g., when remote server 110 wants to query only the respective node) or through linear communication orbit 106a (e.g., when remote server 110 wants an aggregated response to a query from some or all of the nodes 102 in the linear communication orbit 106a).

As described herein, the direct duplex connection between a particular node and remote server 110 is established with the particular node as the initiating party. In other words, from the perspective of the network, the connection is established with an outbound connection request sent from the node, rather than with an inbound connection request sent from the remote server. When the direct duplex connection is established with an outbound connection request sent from the node (e.g., the node sends the initial connection request in the connection establishment protocol (e.g., the handshake request in establishing a WebSocket connection), there is no need to open the firewall of the network, which would expose the network to outside security risks.

In some embodiments, in order to prompt a particular node to initiate the connection request for a direct duplex connection, remote server 110 sends a message or instruction packet to the particular node (e.g., node 102f) through a server of the network (e.g., server 108) and has the message or instruction packet propagated to the particular node through the linear communication orbit (e.g., linear communication orbit 106a). The message or instruction packet contains instruction and necessary data (e.g., public certificate for encryption, IP address, port number) for the particular node to establish the direct point-to-point persistent connection (e.g., a WebSocket connection) with the remote server. When the particular node receives the instruction packet from its upstream node, the particular node initiates the outbound connection request to the remote server. After the remote server receives the connection request from the particular node, the remote server and the node can proceed to establish the duplex connection according to the connection protocol.

In some embodiments, the instruction packet can be dispatched to one or more particular nodes at the command of a network administrator or incident responder. For example, the network administrator uses an administrator's machine 116 (e.g., a computer system or computer implemented device, as discussed below with reference to FIG. 7) to connect to remote server 110 (e.g., via a web interface or a client application provided by a service provider associated with the remote server 110) and manually selects the particular nodes using a network monitoring user interface. In some embodiments, the network monitoring user interface provides other functions, such as generating and modifying application definitions, generating and modifying map requests, displaying interactive maps, providing users with the ability to interact (e.g., changing views, applying additional filter criteria, etc.) with generated interactive maps, etc.

In some embodiments, an event recorder is deployed on each node in the network that continuously records local values for particular indicator items (e.g., commonly used indicator items, such as filenames of newly created/modified/deleted/executed files, IP addresses of network connections, ports accessed, and processes started/killed, etc.) to a local event database. An administrator can query these local event databases from the network monitoring user interface by issuing questions to the network through the linear communication orbit. For example, the administrator's device can send the questions to the server of the network and the questions may be packaged in query messages and propagated to the nodes through the server of the network. Each node along the linear communication orbit will be able to quickly respond to these questions based on the past event data stored in their respective local event databases. After the answers have been collected from all relevant nodes in the network, the server of the network forwards the answers back to the administrator's device.

In some embodiments, after a direct duplex connection has been established between a particular node and the remote server, the administrator can also query the local event database of the particular node through the direction duplex connection. In addition, the administrator can take a snapshot of the local event database on the particular node and have it uploaded to the remote server, so that in-depth analysis regarding the particular node may be performed at the remote server (e.g., according to instructions provided by the administrator to the remote server). More details of the local event database are provided with reference to FIG. 6.

In some embodiments, after a direct duplex connection has been established between a particular node and the remote server, the administrator can collect event data corresponding to connectivity data meeting one or more definitions from the local event database. The administrator can query the particular node and generate a map that includes information about operations meeting application definitions and operations with unknown relationship to specified applications for which the node is configured to monitor connectivity traffic. Collected event data on a map may be grouped by traffic associated with monitored applications, and traffic determined to be not associated monitored applications. A node monitors a specified application by determining whether operations performed at the node meet the application definition of the specified application. The administrator can make a copy of the event data collected from the local event database and local context data (e.g., OS version, memory, installed apps, usernames, etc.) describing the local environment of the particular node, and use them to create new or modify existing application definitions. More details about methods performed over an established connection between a server and a particular node are provided with reference to FIG. 4F.

In some embodiments, based on the in-depth analysis performed on a particular node, the administrator can be prompted to perform particular additional actions by the network mapping user interface. For example, the administrator is presented with sample application definitions, sample filters based on a process and/or a port, or a builder interface enabling the user to generate application definitions, and map requests based on the generated application definitions to obtain, including retroactively, event history data from the local event database that is relevant to existing and newly deployed application definitions. The new application definitions and map requests can be dispatched to the network for a network-wide analysis. In some embodiments, one or more application definitions and/or map requests can be automatically generated based on existing templates and filter values that are found on the particular node. The automatic generation of application definitions and map requests facilitates the investigative process of the administrator, and relieves the administrator from having to create application definitions or map requests from scratch. In some embodiments, the application definitions based on the answers collected from the network can be more refined.

FIG. 2 illustrates a user interface 200 for building (sometimes called generating) an application definition for a specified application 212, according to one embodiment. In some embodiments, user interface 200 may be displayed on administrator's machine 116 that interacts with one or more nodes 102 through server 108 of the network and/or on remote server 110, see FIGS. 1A and 1B. The user interface 200 allows or prompts the user to specify general information 214 for the specified application 212. For example, a user can enter values for data fields including 'application name' 216 and 'description' 218 of the specified application 212. The application definition can later be referenced or pointed to by the value of the data field 'application name' 216. For example, a map request may include an application definition by reference to the value 'ERP' of 'application name' 216.

In addition to general information 214 for the specified application, the user specifies what application components (e.g., software packages 220) and evaluation criteria comprise an application definition. In some embodiments, types of application components that can be tracked and included in an application definition include a process, a file system (e.g., files or contents of a file system), and a registry (e.g., contents or values within a registry). In FIG. 2, such components are shown as selection options under a drop-down menu 222 of user interface 200. In one embodiment, the application definition for application 212 includes software components or elements such as Tanium server 224, SQL Database 234, or file system 244. The user specifies further specifies connections to or from the application components that are to be monitored, recorded and/or summarized. The description entered by a user includes values that will match (or are expected to match) metadata representing events, or operations performed, specified application components and the connections to or from the specified components. Examples of values in the application description include the name of a process (e.g., executable file name), values or ranges of values specifying particular contents of a file system, or values or ranges of values within a registry, and inbound/outbound ports that other nodes in the managed network use to communicate with the specified process, file system, or registry.

User interface 200 allows a user to build the application definition for application 212 and specify the rules for determining whether a node executes an application or component thereof. The rules specify what operations are to be tracked and/or summarized by nodes in the network. For example, the application definition for specified application 212 combines one or more rules related to processes 'TaniumReceiver.exe' 226, Sqlserver.exe' 236, 'postgres.exe' 246, and file system 'File_system' 244. As described in more detail next, user interface 200 provides a rule builder for application definitions.

In this example, the first rule is related to application component 'Tanium server' 224. According to the first rule, if a node performs operations that are associated with process 'Tanium server' 244, and an inbound port 227 that is equal to 443 or 1742, or an outbound port 228 that is equal to any of 80, 443, 1433, 5432, or 17472-17477, then the node stores corresponding metadata in its mapping database, indicating execution of the component 'Tanium server' 244 of specified application 212. For example, if the local event database of a respective node stores a record that shows process 'TaniumReceiver.exe' 226 received communication from another node in the network via any of the values specified for inbound port 227 or outbound port 228, then the respective node copies that record to its mapping database, or updates a corresponding record in mapping database (e.g., to increment a count of events represented by that record) for the specified application 212.

In this example, the second rule is related to the component 'SQL Database' 234. According to the second rule, if a node performs operations that are associated with process 'Sqlserver.exe' 236, and an inbound port 237 that is equal to 1433, then the node stores corresponding metadata in its mapping database, indicating execution of the component 'SQL Database' 234 of specified application 212. The second rule related to 'SQL Database' 234 is an alternative to the first rule related to 'Tanium server' 224, i.e., operations meet the application definition if the operations meet criteria specified by either the first rule or the second rule of the application definition. Application definitions are composite and may include a number of sub-rules related to different components of the application and corresponding connections (e.g., communication events or operations) between the application components. As shown on user interface 200, the sub-rules can be combined using Boolean operators, such as logical 'AND' and logical 'OR'.

Figure 3A:
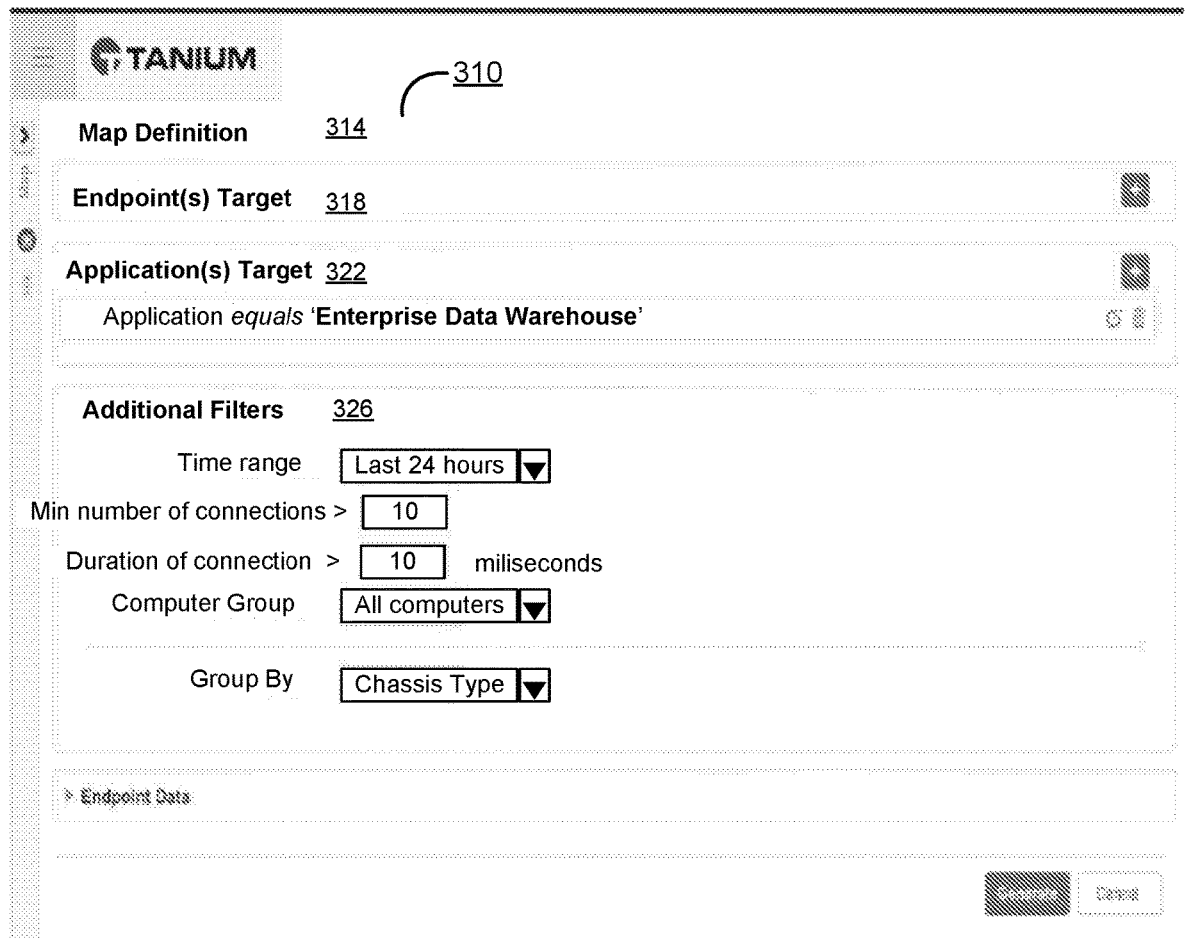
FIG. 3A illustrates an example of a user interface for building a definition of a map request, in accordance with some embodiments.

FIG. 3A illustrates a user interface 310 for generating a definition of a map request 314, according to some embodiments. In one, the map request to be generated is for obtaining the data needed to generating an endpoint based map, which is a map of a specified node. In some embodiments, the map request for producing an endpoint based map is a catch-all request for extracting relevant local event data. For example, an endpoint based map may represent connections made by the specified node (e.g., information identifying the entities on the other ends of those connections), applications and application components, raw or unidentified processes running on the specified node, including information identifying other machines associated with the unidentified processes (e.g., communicating with specified node in conjunction with performing the unidentified processes). On the user interface 310, a user can build an endpoint based map request (i.e., a map request for producing the data needed to generate an endpoint based map) by entering a value for the data field 'Endpoint(s) Target' 318 (not shown in FIG. 3A). In some embodiments, an endpoint based map may be based on one or more endpoint definitions. An application based map establishes what applications (or application components) and/or unknown processes are dependent on the specified node. An endpoint definition may be based on parameters including, but not limited to, parameters identifying one or more nodes, IP addresses, and/or computer groups. An endpoint based map may be useful if an administrator plans to take a group of machines offline, because the administrator can use the endpoint based map to inspect a particular (e.g., specified) node and establish precisely which applications could be impacted if the specified node is taken offline.

An application based map (sometimes called an application map, application dependency map, or service dependency map) is a map for a specified application. An application based map establishes on what nodes an application is dependent across the entire managed network. The application based map represents nodes, potentially including both managed and unmanaged nodes, that execute, or participate in the execution of, an application or multiple applications. An application based map is based on one or more application definitions. An application based map may be useful, for example, if there is an outage and an administrator needs to investigate what changes occurred in the network, e.g., in the last few hours. On the user interface 310, a user can build a map for a specified application by entering a value for the data field 'Application(s) Target' 322. In the example shown in FIG. 3A, the map request 314 is configured to extract data associated with a specified application, e.g., the application 'Enterprise Data Warehouse', from a mapping database located at each node in the network. In particular, the map request is configured to extract event data according to the application definition referenced by the value 'Enterprise Data Warehouse' for the target application.

The map request 314 can further be configured to filter event data by the additional filters 326. Examples of additional filters include a time range, a minimum number of connections (e.g., during the specified time range, or per predefined time period, such as an hour), a connection frequency (e.g., during the specified time range, or per predefined time period, such as an hour), and a minimum connection duration with respect to the one or more operations performed by nodes in the network (e.g., connections shorter than the specified minimum connection duration are not reported in response to the map request). In some embodiments, such as the example shown in FIG. 3A, nodes in the network that do not have a minimum of ten connections occurring within the last twenty-four hours (i.e., the specified time range in this example) do not respond to the map request 314 (e.g., do not send any application mapping information in response to the mapping request), according to additional filters 326. Nodes in the network that respond to the map request 314 include nodes that have performed, in the last twenty-four hours, operations corresponding to at least ten connections of which the application 'Enterprise Data Warehouse' is a part. In one embodiment, the map to be built based on map request 314 groups the connections by chassis type.

Figure 3B:
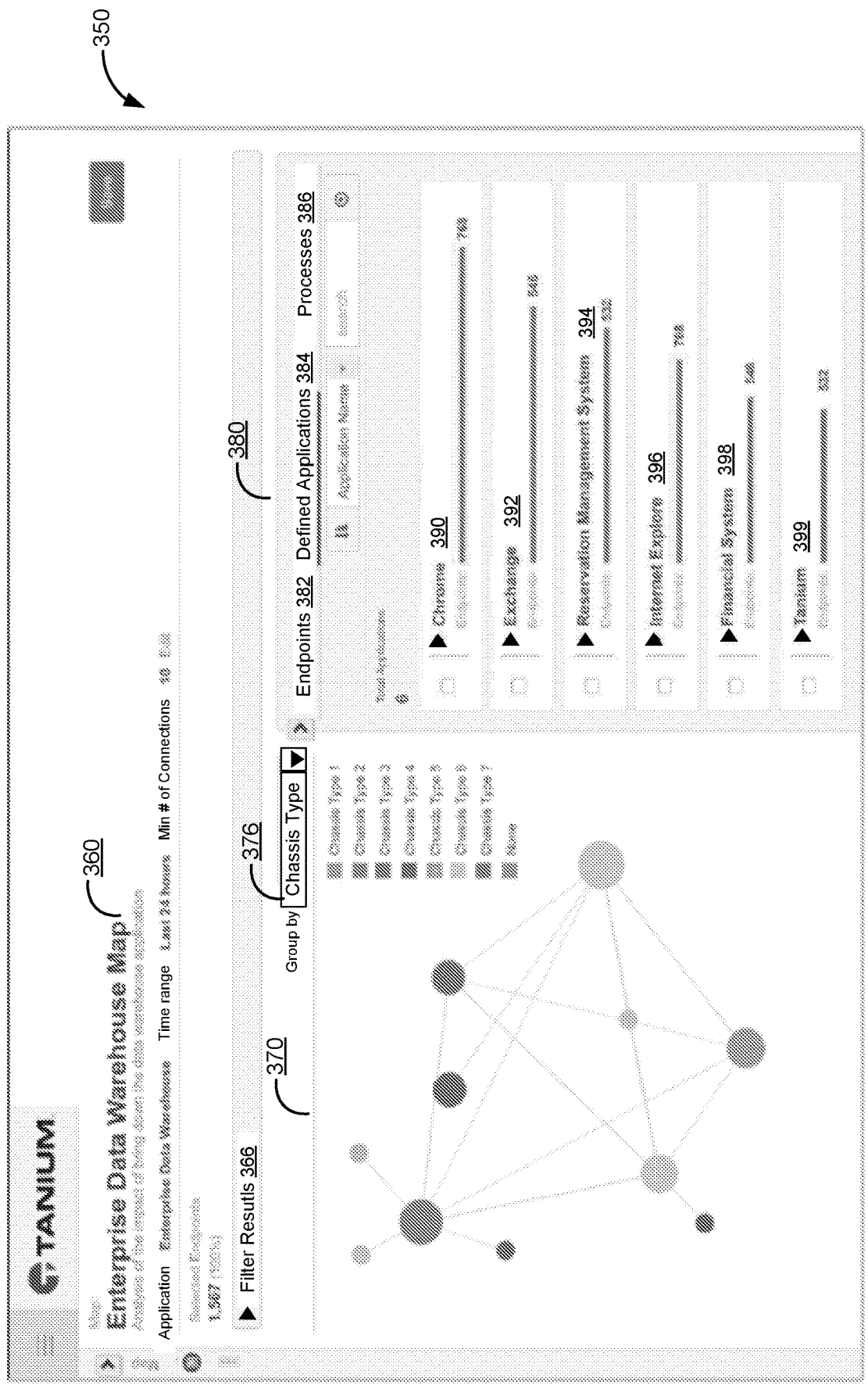
FIG. 3B illustrates a map generated based on responses from a number of nodes to a map request, in accordance with some embodiments.

FIG. 3B illustrates a map 360 generated based on responses to the map request 314 by a number of nodes in the network, according to one embodiment. It could take days or weeks with conventional approaches to build map 360, whereas methods described herein may generate more accurate maps much faster (e.g., in less than 10 minutes, or 5 minutes, in some embodiments). In some embodiments, map 360 is interactive. A user can interact with the data visualization 370 of map 360 and pages 382-386 included in the right-hand panel 380 of map 360.

Map request 314, which includes a set of parameters, is a query that returns to the requesting system (e.g., server 108 or 110, FIG. 1A) summarized historical connection data from one or more managed nodes (e.g., devices on the network that are subject to monitoring and control from a central management server, such as server 108 or 110 or administrative machine 116, for instance by having the management software installed that enables such nodes to communicate with and respond to actions propagated from the central management server). In some embodiments, managed nodes include a local event recorder and modules for automatically receiving and responding to requests from a network administrator, such as server system 108 or 110, or administrative machine 116, FIG. 1B). In the example of FIG. 3B, map 360 displays summarized connection data from 1,567 nodes in response to map request 314. For example, user interface 350 displays a dynamic data visualization 370 of interconnections between managed nodes in the network. As shown on FIG. 3B, a total of 1,567 nodes have responded to map request 314. In other words, the application 'Enterprise Data Warehouse' is dependent on 1,567 nodes. In some embodiments, other nodes in the network may exist that did not respond to map request 314 because the nodes do not execute the application 'Enterprise Data Warehouse' or any of its components, and are not in communication with other nodes in the network in connection with their execution of the application 'Enterprise Data Warehouse' or any of its components (e.g., do not respond to database access requests by the application 'Enterprise Data Warehouse' or any of its components, and do not provide any other services in response to requests by the application 'Enterprise Data Warehouse' or any of its components).

In the example of a map shown in FIG. 3B, the nodes that responded to map request 314 are organized by chassis type, where each circle displayed on data visualization 370 represents one or more nodes that belong to a corresponding chassis type such as 'Chassis Type 1' through 'Chassis Type 7'. In this example, the relative size of each circle is determined based on the number of nodes that belong to the corresponding chassis type. In some embodiments, responding nodes can be organized (in a respective map 360) by other criteria such as computer group, location, time zone, operating system or other characteristic. A user can change how responding nodes are grouped to reveal different types of patterns. For example, the user of map 360 can select one of the options from the drop down menu 'Group by' 376, to change how the responding nodes are grouped.

On the right-hand panel 380, tabs for three pages are displayed, e.g., tabs for 'Endpoints' page 382, 'Defined Applications page' 384, and 'Processes' page 386. The 'Endpoints' page 382 lists all nodes that execute the application 'Enterprise Data Warehouse' (content of 'Endpoints' page 382 is not currently shown on FIG. 3B). In other words, 'Endpoints' page 382 lists all nodes on which the application 'Enterprise Data Warehouse' is dependent.

The 'Defined Applications page' 384 lists all other, potentially interdependent, applications that are running on any of the nodes on which the 'Enterprise Data Warehouse' application depends (content of 'Defined Applications page' 384 is currently shown on panel 360 of FIG. 3B). For example, a server node executing the application 'Enterprise Data Warehouse' may also host multiple other applications such as 'Chrome' 390, 'Exchange' 392, 'Reservation Management System' 394, 'Internet Explorer' 396, 'Financial System' 398, and 'Tanium' 399.

The 'Processes' page 386 list all the processes that were executed on any of the machines or nodes included in the map 360. A user can thus explore raw or unidentified processes. A user may select one or more processes, highlight the processes on the map, and create a new application definition including the selected one or more processes without having to manually research and construct the application definition. A user can simplify map 360 by applying one or more global filters 366, e.g., a filter to exclude from map 360, including from data visualization 370, data about machines that do not belong to a specified machine type.

FIGS. 4A-4F and FIGS. 5A-5B depict flow charts of methods for mapping a network, e.g., determining which nodes in the network execute a specified application or which applications a specified node executes, and building corresponding application based or endpoint based maps, in accordance with some embodiments. An advantage of methods 400 and 500 over conventional processes is that methods 400 and 500 do not require the server system to maintain a library of credentials for the managed nodes, which in conventional systems would be required in order to obtain event information from such nodes. Another advantage over conventional processes is the speed at which a server node can obtain event information from all nodes participating in the execution of a specified application, and then build one or more maps depicting the participating nodes, relationships between those nodes, etc. As discussed elsewhere, methods 400 and 500 enable such information to be gathered from large numbers of nodes (e.g., over 1000 nodes, or over 10,000 nodes) in a network in a matter of minutes (e.g., in under 10 minutes, or under 5 minutes), and to then build one or more maps based on the obtained information.

FIGS. 4A-4F depict a flow chart of a method 400 for mapping a network (e.g., network 100, FIG. 1A), in accordance with some embodiments. Method 400 is also herein called mapping process 400, and process 400. In some embodiments, mapping process 400 is performed by a node (e.g., node 102f, or any of nodes 102b-102f, FIGS. 1A-1B) in a network (e.g., network 100, FIG. 1A). For brevity, method 400 is described below as being performed by a respective node (e.g., node 102f, FIGS. 1A-1B) in a network (e.g., network 100, FIG. 1A) comprising a collection of nodes (e.g., a non-static collection of nodes 102) that forms a linear communication orbit (e.g., linear communication orbit 106a, FIGS. 1A-1B). The respective node can optionally form a direct duplex connection (e.g., duplex connection 112, FIG. 1B) with a respective server (e.g., remote server 110, FIG. 1B) after receiving an instruction packet from the respective server through a server of the network (e.g., server 108) and the linear communication orbit (e.g., linear communication orbit 106a, FIG. 1B).

Because mapping process 400 is decentralized and performed by and distributed over individual nodes in the network, mapping process 400 is more efficient than conventional, centrally controlled mapping processes, and does not burden the network compared to conventional approaches. While the server propagates an application definition or map request through the linear communication orbit, from node to node in the linear communication orbit, nodes are receiving the application definition or map request and acting upon the received application definition, or responding to the incoming map request, in parallel to other nodes receiving and/or processing the application definition, processing other application definitions, responding to the map request, or responding to other map requests. The server does not need to send the application definition to each individual node. Instead, nodes in the orbit propagate the application definition according to predefined rules of the linear communication orbit. Thus, the mechanism of propagating an application definition is decentralized. Similarly, when collecting data along a linear communication orbit (or multiple linear communication orbits), the server may propagate a map request down the linear communication orbit, the map request is processed in parallel at the nodes, and answered by as many nodes as possible (e.g., by nodes that satisfy criteria specified by an application definition included in the map request), without being held up by any slow responding nodes. In some embodiments, application definitions and map requests are sent in the orbit via separate messages. However, in other embodiments, an application definition may be sent concurrently or as part of the same message with a map request. Nodes continuously or periodically (e.g., once per hour, or other time period) process or act upon application definitions deployed on the nodes. Thus, nodes perform pre-processing of data relevant for the mapping process described herein, including process 400 and 500. The nodes await map requests and, when map requests are received, a respective node can quickly respond with metadata, or information about (e.g., summarizing) metadata, that has already been locally collected or generated. The nodes do not need to wait for map requests, and instead gather relevant metadata for local events that meet deployed application definitions (e.g., as part of a background process executed by each of the nodes), independent of the receipt of any map requests. Thus, mapping process 400 speeds up the mapping process compared to conventional mapping processes.

Method 400, as performed by a respective node, is optionally governed by instructions that are stored in a non-transitory computer readable storage medium and that are executed by one or more processors of the computational machine (e.g., any one of machines 600, FIG. 6, and 1006-1018, FIG. 10) at the respective node. Each of the operations shown in FIGS. 4A-4F may correspond to instructions stored in a computer memory or non-transitory computer readable storage medium (e.g., memory 604 of machine 600 in FIG. 6). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 400 may be combined and/or the order of some operations may be changed.

In some embodiments, mapping operations of method 400 are performed (402) at a respective node in a network comprising a plurality of machines located at a non-static collection of nodes that form a linear communication orbit. During method 400, the respective node receives (406) an application definition through the linear communication orbit. For example, the application definition is typically propagated (e.g., from node to node) from a starting node (e.g., an upstream node of the respective node in the linear communication orbit, or server 108, which in the topology shown in FIGS. 1A-1B can be viewed as a starting node in the linear communication orbit 106a) to the respective node through one or more upstream nodes of the respective node (e.g., nodes 102b-102e, when node 102f is the respective node) along the linear communication orbit. In some embodiments, the application definition is sent (406) by a server system (e.g., remote server 110, or administrator's machine 116, see FIGS. 1A and 1B) coupled to the linear communication orbit and propagates from node to node along the linear communication orbit.

The application definition specifies (406) criteria for establishing which nodes execute a specified application, a component of the specified application, or communicate with another node executing the specified application or a component of the specified application (e.g., application definition 212, FIG. 2). The application definition is used by the respective node to collect or generate metadata for events or operations that meet the application definition, thereby preprocessing event information that may be requested by one or more subsequently received map requests. As used herein, the term "application" is used to mean a logical business application comprising one or more software components, one or more machines, and corresponding traffic associated with the one or more machines or software components. An application is represented by or defined in an application definition in the context of mapping processes described herein, including processes 400 and 500. The application definition enables map process 500, described below with reference to FIGS. 5A-5B, to identify components of applications across the environment (e.g., the managed network) and show how the components interrelate with respect to the application.

In some embodiments, the application definition identifies (e.g., by file name) at least one component of the specified application and corresponding inbound or outbound ports for connection to or from the specified component (408). In particular, an application definition may specify one or more components such as a process, a file system, or a registry, and corresponding inbound or outbound ports for connection to or from the one or more specified components. For example, a simple web application may be defined in an application definition by three components, e.g., a front-end executable file, a database executable file, and a client executable file, and then specific ports on which the three components communicate. In some embodiments, users (e.g., users of an administrative machine 116, FIG. 1B) are provided with a functionality to build application definitions, e.g., via application builder interface 200 shown in FIG. 2.

In some embodiments, the respective node maintains (404) a local event database storing metadata for predefined events occurring at the respective node. The predefined events correspond (404) to operations performed at the respective node. In some embodiments, the predefined events are specified by broad event definitions (e.g., all file creations, process executions, registry modifications, operation failures, security events, and network activity (communications with other nodes), etc., or a subset of the aforementioned types of events) that are independent of the application definitions.

Metadata is stored in the local event database for events that meet one or more definitions. In some embodiments, a recorder (e.g., a software module or application) installed on the respective node stores event metadata in the local event database when the recorder determines that the node performs operations meeting the one or more definitions. In some embodiments, the recorder records event histories (e.g., records of events such as file creations, process executions, registry modifications, and network activity) continuously as the events occur. Examples of relevant events include, but are not limited to, file events (e.g., creation, deletion, or modification of files), network communication events, user events, security events, process events, etc. More details of the local event database are provided with reference to FIG. 6. In some circumstances, the events recorded in the local event database include events associated with specified applications, for example, events that meet the application definition received (406) at the respective node (e.g., application definitions 624, FIG. 6). For example, some of the TCP connections recorded in the local event database satisfy criteria specified in the application definition. However, as noted above, the definitions used by the node to determine what events to record in the local event database are typically independent of the application definitions received by the respective node.

Once the application definition is received (406), the respective node determines (410) that the respective nodes performs one or more operations meeting the application definition, including identifying one or more operations meeting the application definition. For example, an agent process (a process executing event recorder module 620 and/or mapping module 622, FIG. 6) running at the respective node may determine and identify events to be recorded in the local event database (e.g., local event database 626 and/or mapping database 628, FIG. 6) that meet the application definition, and then record those events in the local event database. In some embodiments, the agent process has privileged access to all applications and other processes executed by the respective node, and thus has full visibility to the activity of the respective node, including the ability to attribute network activity and other activities of the respective node to the process and user that initiated that activity. In such embodiments, the agent process is able to record a full range of events, including data communication events, application execution events, and the like, that are relevant to the received application definition and to include relevant information, such as the responsible process and user, communication port (if applicable), event duration, and the like, for each recorded event.

In some embodiments, every connection by the respective node to any other computer (e.g., every TCP connection, and/or DNS connection, or the like) is logged in the local event database (e.g., local event database 626, FIG. 6) along with other metadata including, but not limited to, an associated process, port, and timestamp. In some embodiments, the agent process maps TCP (and optionally other) connections logged in the local event database to one or more deployed application definitions (e.g., the respective node may maintain a local store such as a library of deployed application definitions, received by the respective node from a server system), and determine and identify the TCP (and optionally other) connections meeting the application definition.

In some embodiments, the identified one or more operations meeting the application definition include (412) operations performed prior receiving the application definition at the respective node, such that the one or more operations and corresponding metadata associated with the one or more operations are "retroactively" identified in the local event database according to the application definition. This aspect of method 400 (and method 500, FIG. 5) provides an advantage over conventional methods. In contrast to conventional methods, methods 400 and 500 may identify, store, and/or summarize historical event data associated with the execution of a specified application, thereby enabling a server system to build comprehensive and accurate maps. Moreover, the maps can be built for corresponding time periods, e.g., the event data may be sliced in time periods (or time buckets).

In some embodiments, the identified one or more operations include operations performed before the application definition is received and/or after the application definition is received. Because the local event database stores historical event data (e.g., all TCP connections for a given time period) without regard to existing or deployed application definitions, maps for specified application can be built retroactively according to application definitions not existing at the time the event data was recorded in the local event database. In contrast, conventional approaches do not have the ability to retroactively build an application based map. Typically, conventional approaches do not use historical event data of nodes in the network but instead probe the network only after an incident in the network has occurred. Thus, conventional methods generate less accurate and less comprehensive application based maps.

In some embodiments, a mapping database (e.g., mapping database 628, FIG. 6) is maintained (418) at the respective node (FIG. 4B). The mapping database is configured to store information corresponding to a subset of data stored in the local event database. In some embodiments, and typically, the mapping database has a size smaller than the size of the local event database (416). In some embodiments, the mapping database is continuously populated by method 400 as events at the respective node occur. In some other embodiments, the mapping database is populated by method 400 periodically, at predefined intervals, such as once per hour, or predefined times (at specified times, each day). In some embodiments, when a new or revised application definition is received by the respective node, the node applies the new or revised application definition so as to identified all corresponding events in the local database, and adds (or updates) corresponding information to the mapping database. In some such embodiments, after the initial application of the new or revised application definition, the mapping database is thereafter updated periodically, at predefined intervals or predefined times.

In some embodiments, the respective node has a local copy of application definitions (e.g., application definitions 624, FIG. 6) received by the respective node, and the respective node records in the mapping database event data that meet one or more of the application definitions.

In accordance with the determination that the respective node performs the one or more operations meeting the application definition, the respective node identifies (414) metadata associated with the one or more operations meeting the application definition. The respective node identifies the metadata associated with the one or more operation meeting the application definition in the local event database. Once identified, the respective node stores (422) in the mapping database the metadata, or information corresponding to the metadata, associated with the one or more operations performed by the respective node that meet the application definition. In some embodiments, an agent process running on the respective node identifies the metadata, extracts the metadata from the local event database, and records in its mapping database the extracted metadata and/or a summary of the extracted metadata. In some embodiments, the agent process is triggered periodically, for example, every hour. In other embodiments, instead of extracting metadata from the local event database using an agent process running on the respective node, metadata from the local event database is extracted and recorded in the local mapping database (or a summary of the extracted metadata may be recorded) in response to an additional command (e.g., sent prior to a map request) received by the respective node (e.g., from the server system). More details with respect to the local event database and the metadata extraction process are provided with respect to FIGS. 5 and 6.

In some embodiments, the information corresponding to the metadata stored (422) in the mapping database includes (420) one or more events summaries associated the specified application. For example, once the agent process (e.g., method 400) determines which TCP connections (and optionally other connections to other nodes or machines, if such other connections are included in the local event database) in the local event database meet the application definition, the agent process either records in the mapping database information identifying the TCP (and optionally other) connections meeting the application definition along with other metadata including an associated port, or records in the mapping database a summary based on the identified TCP (and optionally other) connections meeting the application definition. Event summaries are generated for respective time periods in a sequence of time periods, each event summary including a summary of one or more predefined characteristics of the one or more operations performed during the respective time period. In some embodiments, the agent process that extracts metadata for each application definition generates a summary of the events between the node and each distinct other node or distinct entity (e.g., the entity corresponding to the IP address and port used for communication with the other node), and stores a single event summary record in the mapping database for each distinct entity with which the respective node interacted during the time period for which the summary record is generated. The summary record may include information such as the number of events and the average duration of each event for the time period for which the summary record is generated. In this context, the events for which the summary record is generated are events that meet the application definition and that concern interactions with the other node or entity to which the summary record corresponds. However, in some embodiments, the events recorded in the local event database and summarized in the mapping database further include events that occur solely at the respective node, such as local execution of a database application or service, even when such local execution does not include communication with other nodes.

In some embodiments, an agent process continuously or periodically populates the local mapping database by extracting and summarizing relevant metadata from the local event database, thereby pre-processing relevant data while awaiting a map request. Such pre-processing increases the speed with which methods 400 and 500 produce application based maps, in response to requests to produce such application based maps, compared to conventional methods. Operations 416-422 represent pre-processing operations based on one or more application definitions. The pre-processing is performed at each node and thus the associated computational load is spread over all the nodes which participate in execution of the application. When a map request is received by nodes in a managed network, the nodes have already pre-processed the necessary information to build a map of the network (e.g., an application based map or an endpoint based map).

Figure 4C:
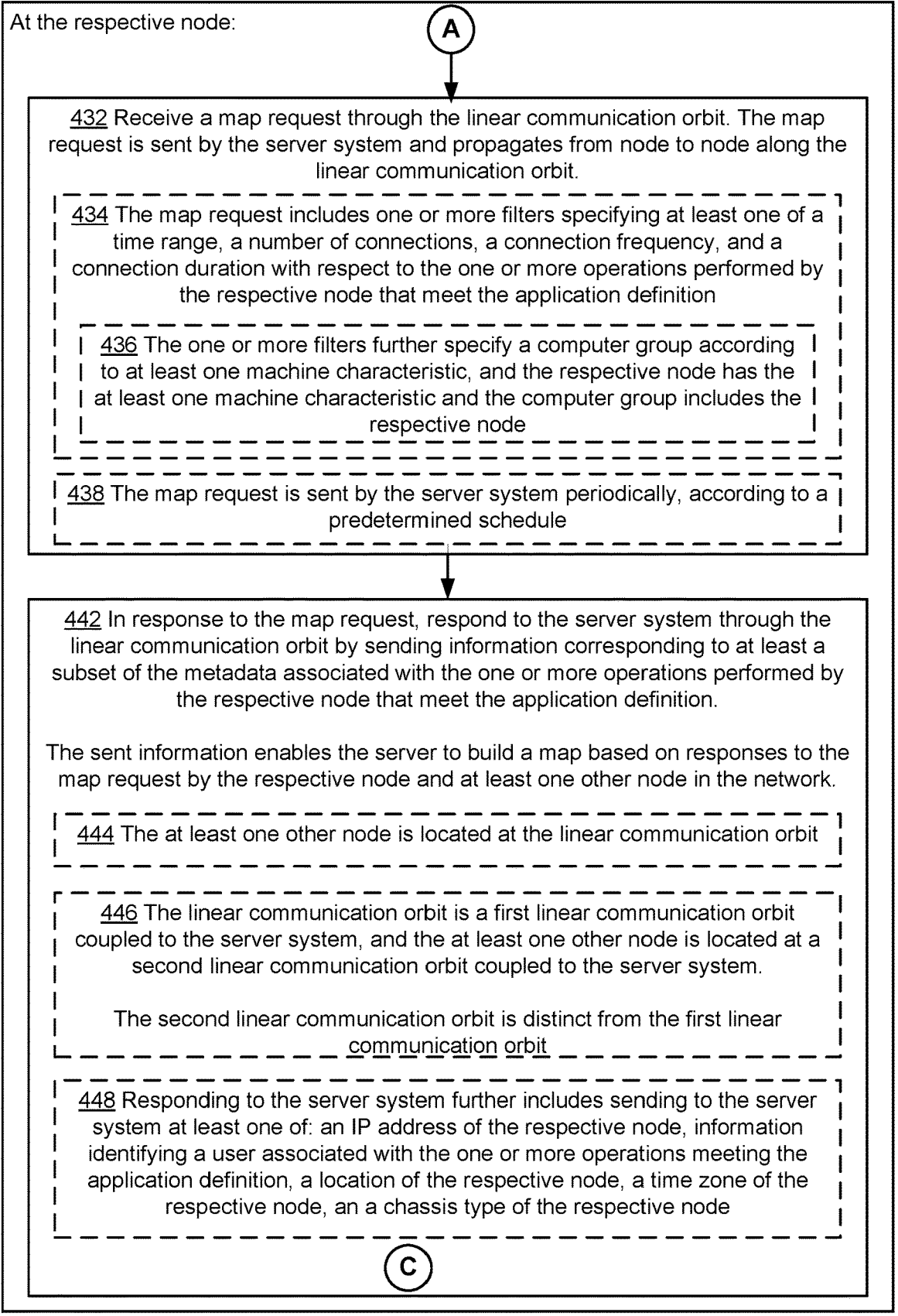

In some embodiments, the respective node receives (432) a map request through the linear communication orbit (see FIG. 4C). The map request is sent by the server system and propagates from node to node along the linear communication orbit. In some embodiments, the map request identifies an application definition, or a set of two or more applications, for which information (e.g., application mapping information, or event information) is being requested by the map request.

In some embodiments, the map request may be sent by the server system periodically (438), according to a predetermined schedule. A map request may include (434) one or more filters. Examples of filters include, but are not limited to, a time range, a number of connections (e.g., a minimum number of connections per time period), a connection frequency (e.g., a minimum connection frequency for each time period), and a connection duration (e.g., a minimum connection duration for each connection) with respect to the one or more operations performed by the respective node. In some embodiments, the filters include one or more application definition identifier, identifying one or more applications definitions for which information (e.g., application mapping information, or event information) is being requested. Furthermore, in some embodiments, the filters in a map request include other filters, not identified here, that are applied to the information stored in the mapping database so as to determine what information to return in response to the map request. As explained elsewhere in this document, a map request can include multiple filter criteria that are combined using Boolean operators, such as logical 'AND' and logical 'OR' to produce an expression that represents the specified combination of filter criteria that are to be applied to the information stored in the mapping database.

The one or more filters of the map request are applied to the information stored in the mapping database, and in particular to the information stored in the mapping database for operations performed at the respective node that meet the application definition. Data extracted from the local mapping database in response to the map request is filtered according to the one or more filters included in the map request. In some embodiment, the one or more filters may further specify (436) a computer group according to at least one machine characteristic. In some embodiments, the respective node has the at least one machine characteristic and the computer group includes the respective node.

In response to the map request, the respective node responds (442) to the server system through the linear communication orbit by sending information corresponding to at least a subset of the metadata associated with the one or more operations performed by the respective node that meet the application definition. The sent information enables the server to build a map based on responses to the map request by the respective node and at least one other node in the network. In some embodiments, the at least one other node is located in the same linear communication orbit as the respective node. In some other embodiments, the linear communication orbit is a first linear communication orbit coupled to the server system (446), and the at least one other node is located at a second linear communication orbit coupled to the server system. The second linear communication orbit is distinct from the first linear communication orbit (446).

In some embodiments, the respective node may respond (442) to the map request by sending relevant metadata or a summary of the relevant metadata extracted from the local mapping database, where the relevant metadata is associated with the one or more operations performed by the respective node that meet the application definition. In some embodiments, the respective node may respond with a link to a storage location including the relevant metadata or one or more summaries of the relevant metadata. In some embodiments, the respective node's response (448) to the server system further includes sending to the server system at least one of the following: an IP address of the respective node, information identifying a user associated with the one or more operations meeting the application definition, a location of the respective node, a time zone of the respective node, a chassis type of the respective node, etc.

As noted above, the map request is typically sent to and received by multiple nodes in the linear communication orbit. In some embodiments, the map request is a query message having a query portion and a response portion. Answers to the query by the nodes are aggregated in the response portion and the map request is conveyed from node to node through the linear communication orbit. Operations 450-456 of process 400, shown in FIG. 4D, represent the aggregation of responses from two distinct nodes located in the same linear communication orbit.

As also noted above, in response to the map query, the respective node responds (442) to the server system through the linear communication orbit by sending information corresponding to at least a subset of the metadata associated with the one or more operations performed by the respective node that meet the application definition. The subset of the metadata included in the response sent by the respective node to the server system is or includes (450) a first subset of metadata associated with a first plurality of operations performed by the respective node that meet the application definition. However, as noted above, in some embodiments, the map request received by the respective node includes (e.g., in a response portion of the map request), and thus the respective node receives (454), a second subset of metadata associated with a second plurality of operations performed at a second node in the linear communication orbit (e.g., an upstream node in the linear communication orbit that receives the map request prior to the respective node receiving the map request). The second node is a node in the network distinct from the first node. The second plurality of operations also meet the application definition.

The respective node aggregates (456) the first subset of metadata with the second subset of metadata already included in the map request, thereby aggregating the answers (i.e., metadata) produced by the respective node and the second node in response to the map request, and returns the aggregated metadata to the server system via the linear communication orbit. For example, if the request path (see discussion of request paths with respect to FIG. 1A) for the map request includes additional nodes in the linear communication orbit, the map request, including the aggregated answers, is forwarded to a next node in the linear communication orbit. After a last node in the request path processes the map request, the aggregated answers, including the answers produced by the respective node, are sent to the server system by that last node in the request path.

In some embodiments, the server system is coupled to an administrator's machine (e.g., administrator's machine 116, FIG. 1B). In some embodiments, the server system, prior to sending the application definition, receives (462) from the administrator machine an application definition deployment instruction to deploy the application definition to the linear communication orbit. The application definition deployment instruction includes the application definition and optionally includes identifier(s) of one or more nodes in the linear communication orbit, including the respective node. Alternatively, instead of node identifiers, the application definition deployment instruction includes matching criteria (e.g., criteria specifying an operating system and/or other machine characteristics) specifying which nodes in the linear communication orbit are to receive the application definition.

Similarly, an administrator machine may request that a map be generated. For example, the server system, prior to sending the map request, receives (466) from the administrator's machine a map instruction or command to send the map request to the linear communication orbit. As described above, the administrator may include (464) one or more filters in the map request. Some or all steps of method 400 may be performed in response to commands sent from the administrator's machine.

It is important for map builders (e.g., administrators or other persons managing or inspecting a respective network) to be able to pull event information from nodes of interest (e.g., nodes that are not responding, nodes that are known to execute a specified application, nodes executing unspecified applications, etc.) and, optionally, visualize the event information. Once point-to-point (e.g., full duplex) connections are established between a remote server and one or more nodes of interest, a remote server may interact with the nodes and transfer data to and from the nodes through the point-to-point connections. To facilitate mapping activities, including building application definitions, methods described with reference to FIG. 4F allow point-to-point connections (e.g., direct connections, direct duplex connections) to be established between the remote server (e.g., a third-party investigating server) with nodes in a linear communication network, with outbound connection requests being sent out from the nodes. For example, in accordance with operations shown in FIG. 4F, a user may establish a connection to a specified node, and build an application definition from event data (e.g., event data for unknown processes) obtained from the specified node.

In some embodiments, the respective node receives (470) from the server system instructions for establishing a direct duplex connection between the respective node and a remote server (e.g., a remote server system 110, FIG. 1A or 1B). In various embodiments the remote server is a distinct server from the server system (e.g., server 110, distinct from server 108, FIGS. 1A and 1B), or is the same server as the server system, or is a trusted client computer system used by a network administrator or incident responder to investigate operations by and/or events at the respective computer.

To establish the trusted client-initiated connection, the server system injects an instruction packet into the linear communication orbit, which travels from node to node through the upstream nodes of the respective node before reaching the respective node. The instruction packet includes instructions for establishing a direct duplex connection (e.g., a direct full-duplex connection, such as a WebSocket connection) with the remote server. Thus, by sending an instruction package to the node through a server of the network and the linear communication orbit, the remote server prompts the node to send the outbound connection request. The instruction packet includes the information needed for the node to construct the outbound connection request to the remote server. For example, in some embodiments, the instruction packet includes a public certificate, IP address, and/or port that is used by an executable on the node to initiate an outbound connection (e.g., a TCP connection over SSL) to the remote server. In some embodiments, these methods provide a way to establish a trusted connection to a remote server whose identity is trustable because it is the only server with the proper private side of a public-private key pair.

In response to receiving the direct communication instruction through the linear orbit, the respective node sends (472) an outbound connection request to the remote server to establish the direct duplex connection between the respective node and the remote server. The respective node establishes (473) the direct duplex connection according to the instructions received through the linear communication orbit. Thereafter, the respective node can send secure messages (e.g., encrypted messages) and upload historical event data directly to the remote server (e.g., rather than by propagating messages from node to node through the linear communication orbit); and, the remote server can interact directly with the respective node rather than having to convey all communications with the respective node through the network's server (e.g., server 108, FIGS. 1A and 1B) and the linear communication orbit. More details on the functionality of and the manner in which direct-duplex connections between a node and a remote server are established are provided in the Incorporated Disclosure.

In some embodiments, the respective node receives (474) an instruction from the remote server to upload local data though the direct duplex connection. The local data is related to operations performed at the respective node. For example, the direct duplex connection (e.g., a point-to-point direct full-duplex connection) can be used by map builders, (who are, for example, network administrators of the monitored network, and/or third-party incident responders) to pull local data from the respective node, including event histories, for both known and unknown traffic.

In response to the instruction (e.g., a map request for an endpoint based map), the respective node uploads (476) local data to the remote server. In some embodiments, the instruction includes a request to capture a snapshot of the local database of event history. The remote server is configured (476) to perform analysis on the local data received from the respective node. In some embodiments, or in some circumstances, such as in response to particular instructions from the remote server, the respective node extracts data from the local event database and sends extracted data to the remote server through the direct duplex connection. For example, the remote server may receive from the respective node a snapshot of the local event database for a predetermined period of time (e.g., TCP connections that have occurred during the last twenty-four hours), and the remote server analyzes the received snapshot of the local database in accordance with any of a variety of predefined procedures and/or queries composed by an administrator or user of the remote server.

In some embodiments, based on the analysis performed by the remote server, the remote server provides parameters or filter criteria (e.g., candidate parameter values or candidate filter criteria, selectable by a user of the remote server or an administrator's machine) to be included (or selectable by a user for inclusion) in a new application definition, to be sent to the respective node and other nodes in the network.

In some embodiments, based on the analysis, the remote server or other server system builds an endpoint based map that includes information corresponding to traffic associated with known applications (applications for which an application definition is deployed and processed locally) as well as information corresponding to unknown traffic (i.e., traffic that is not determined to be associated with a deployed application definition). The endpoint based map may group traffic in a first group of known traffic, further grouped according to specified applications, and a second group of unknown traffic. In some embodiments, the user may select (e.g., from map's data visualization) one or more unknown processes and/or associated metadata (inbound and outbound ports) and build an application definition based on the selected one or more unknown processes and associated metadata. In some embodiments, once the user identifies portions of an endpoint map that are of interest, such as a portion corresponding to an unknown process, the remote server provides the user with suggestions of parameter values to be included in one or more application definitions, enabling the user to obtain additional information regarding one or more processes unknown to the user. Thus, the user may establish a duplex-connection with a respective node and build a custom application definition while exploring a map generated based on local events of the respective node, where at least some of the local events of the respective node do not necessarily satisfy an application definition.

FIGS. 5A-5B are a flow chart of a process 500 for mapping a network, e.g., building an application based map, in accordance with some embodiments. For brevity, process 500 is described as being performed by a respective server (e.g., server 108, or remote server 110, FIG. 1B), which in some embodiments is a remote server that performs mapping operations based on responses received from a respective node (e.g., node 102f, FIG. 1B) and is optionally separated from the respective node by a firewall (e.g., firewall 104, FIG. 1B).

Figure 7:
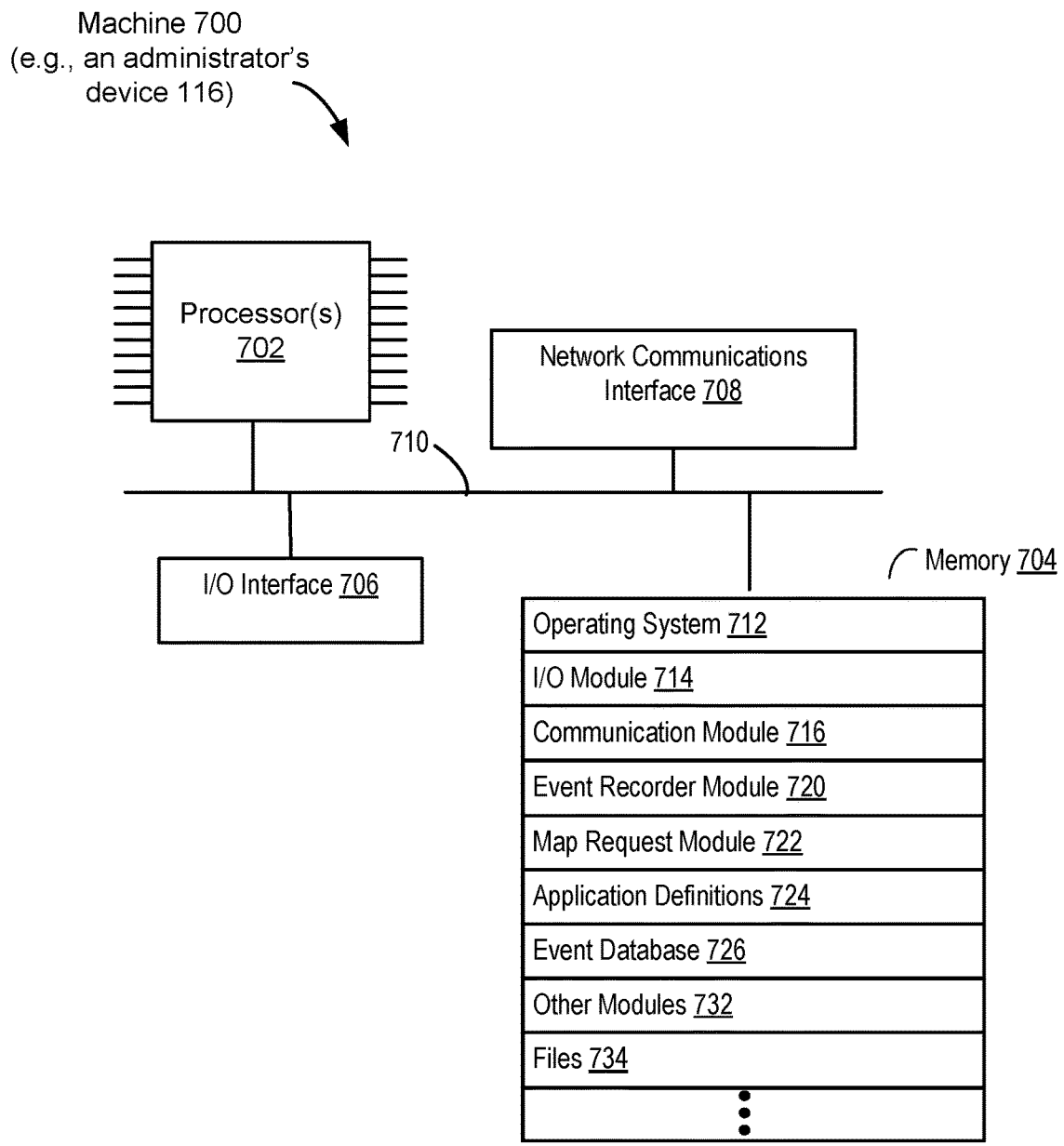
FIG. 7 is a block diagram of a system (e.g., an administrator's device) in accordance with some embodiments.
Figure 8:
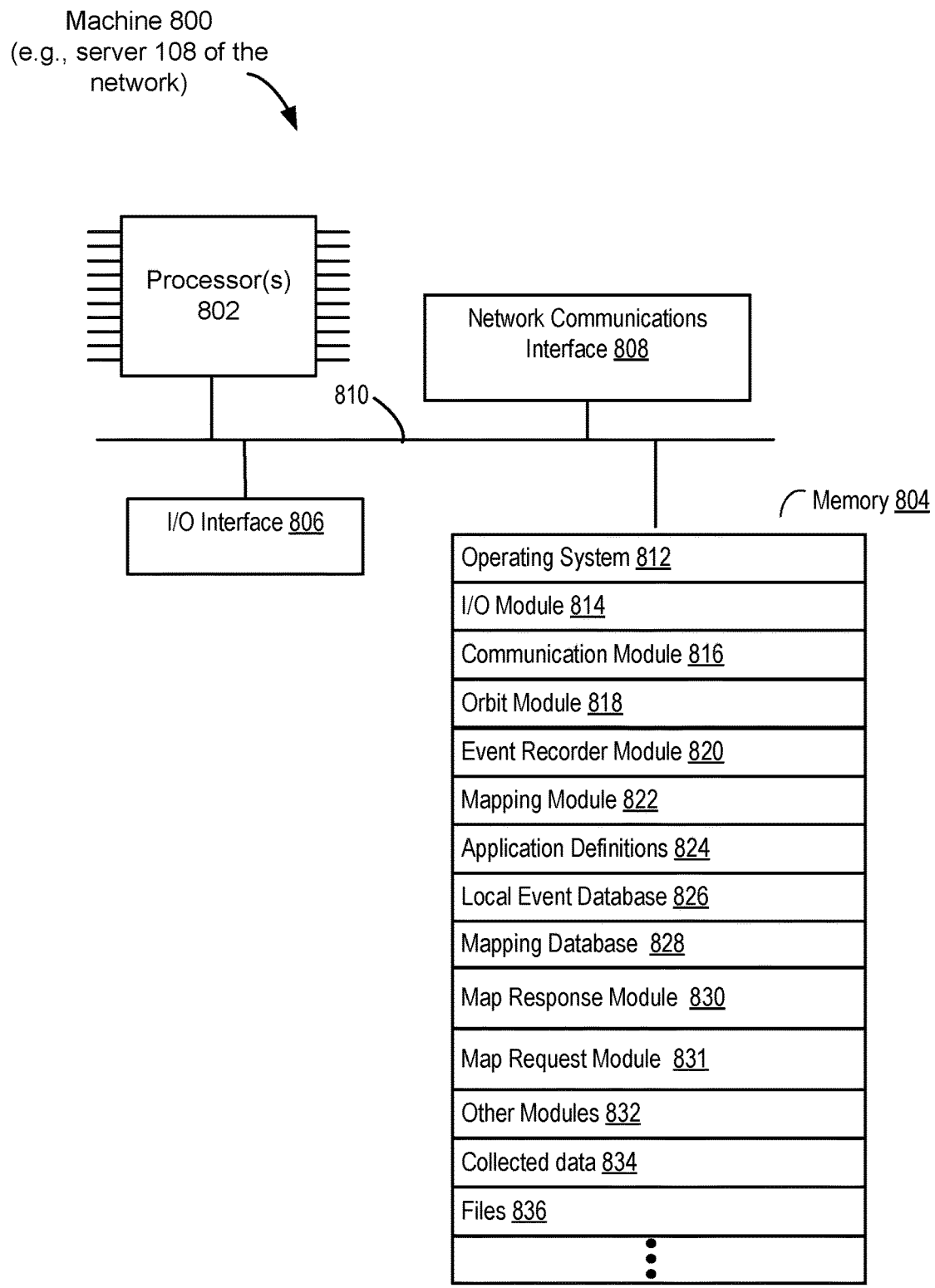
FIG. 8 is a block diagram of a system (e.g., a server of the network) in accordance with some embodiments.
Figure 9:
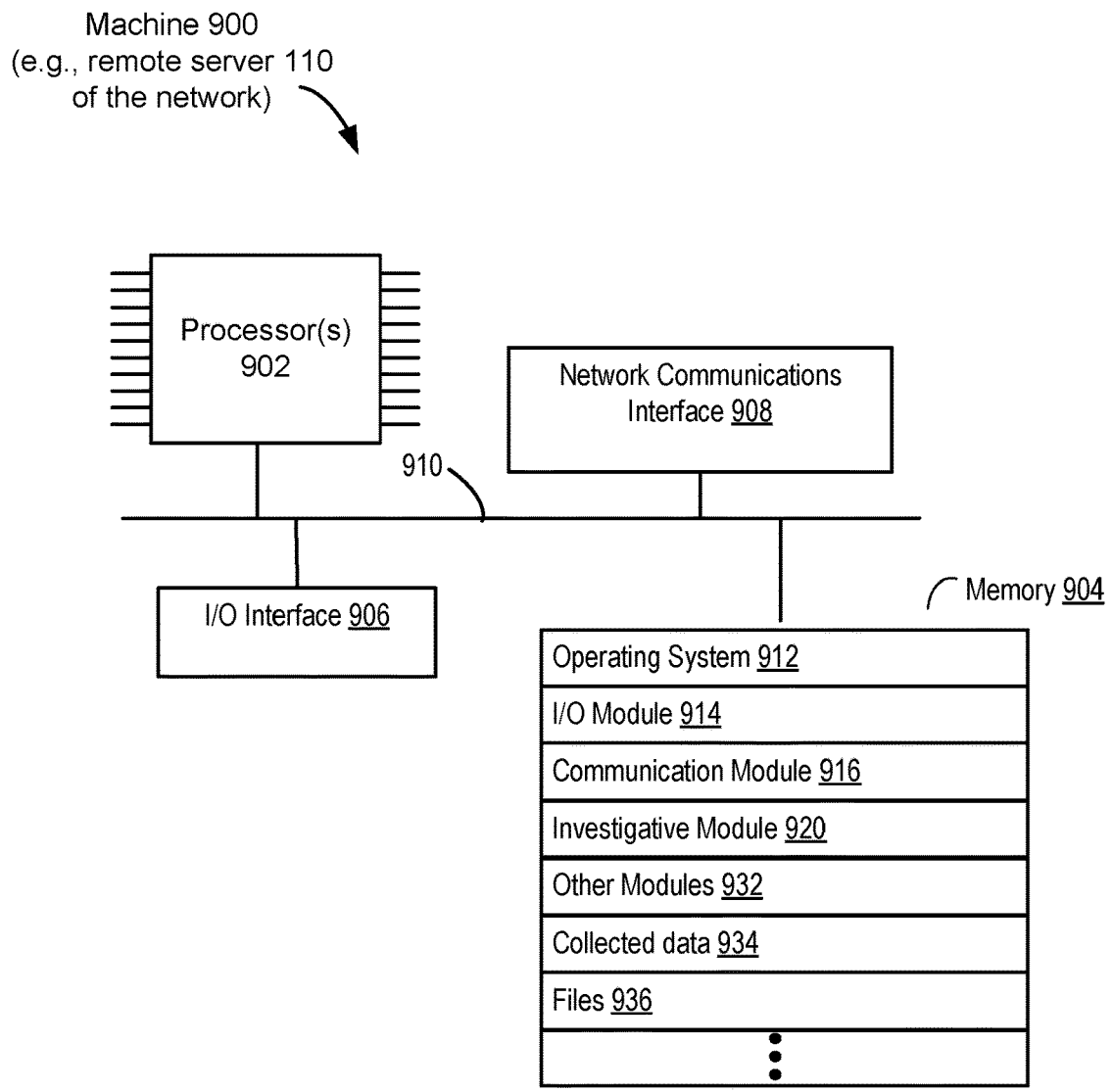
FIG. 9 is a block diagram of a system (e.g., a remote investigating server) in accordance with some embodiments.
Figure 10:
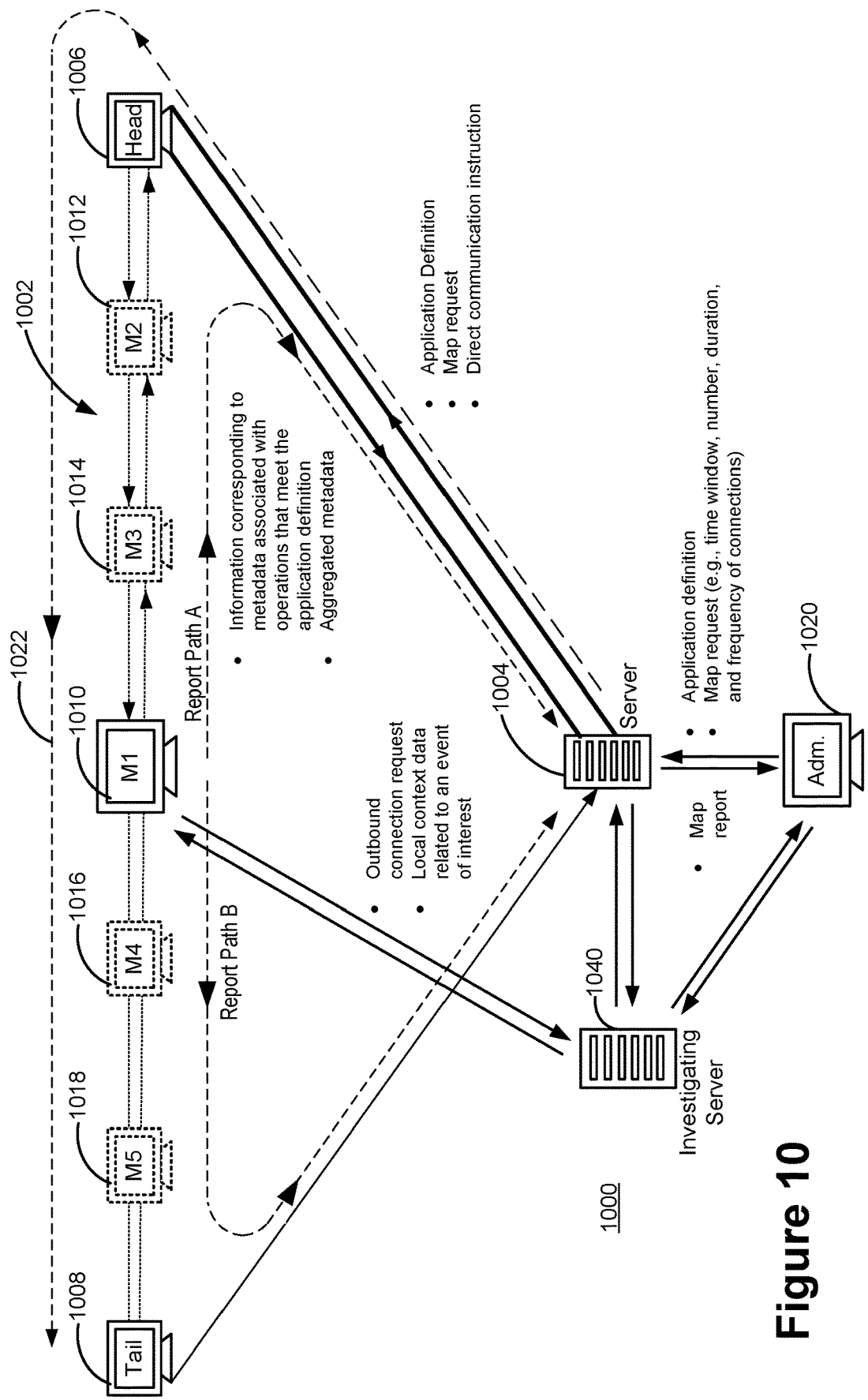
FIG. 10 illustrates an example mapping system that maps events in a network including a plurality of machines located at a non-static collection of nodes that form a linear communication orbit, in accordance with some embodiments.

Method 500 is optionally governed by instructions that are stored in a non-transitory computer readable storage medium and that are executed by one or more processors of the computational machine (e.g., machine 700 in FIG. 7, machine 800 in FIG. 8, machine 900 in FIG. 9, or machine 1004 or 1040 in FIG. 10). Each of the operations shown in FIGS. 5A-5B may correspond to instructions stored in a computer memory or non-transitory computer readable storage medium (e.g., memory 804 of machine 800 in FIG. 8). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 500 may be combined and/or the order of some operations may be changed.

Method 500 for building a map in a network is faster and more efficient than conventional methods because respective nodes collect and pre-process data relevant for the map. In some embodiments, mapping operations of method 500 are performed at a server system in a network comprising a plurality of machines located at a non-static collection of nodes that form a linear communication orbit. In some embodiments, the server system (e.g., server system 108, a remote server such as remote server 110, or administrator's machine 116, see FIGS. 1A and 1B) is coupled to the linear communication orbit.

During method 500, the server system sends (502) an application definition through the linear communication orbit. The application definition is propagated from node to node along the linear communication orbit. For example, the application definition is propagated from a starting node (e.g., a node in the linear communication orbit, or server 108, which in the topology shown in FIGS. 1A-1B can be viewed as a starting node in the linear communication orbit 106*a*) to a respective node through one or more upstream nodes of the respective node (e.g., nodes 102*b*-102*e*, when node 102*f* is the respective node) along the linear communication orbit. The application definition specifies (502) criteria for establishing which nodes execute a specified application, a component of the specified application, or communicate with another node executing the specified application or a component of the specified application (e.g., application definition 212, FIG. 2).

In some embodiments, and typically, nodes in the communication orbit keep a local copy of application definitions received by those nodes from a remote server or other server system. In some embodiments, when a node receives an application definition, the node determines if a copy of the application definition is already stored locally, e.g., in a local database or local cache. If the node does not already have a local copy of the application definition, it stores a local copy of the received application definition, and if the node already has a local copy of the application definition, the existing local copy of the application definition is simply retained. In either case, the node forwards the application definition to the next node, if any, in the linear communication orbit, according to predefined rules for operating the orbit described in more detail in the Incorporated Disclosure.

Processing of the received application definition by each node that receives the application definition is described above with reference to method 400, FIGS. 4A-4F. As described above, once the application definition is received by a respective node, and the respective node initiates processing of the application definition, the respective node populates a local mapping database by extracting and/or analyzing relevant event data from a local event database. The node, in accordance with the application definition, captures and stores event metadata relevant for building an accurate map of the application in the managed network. The pre-processing operations of the node, in accordance with the application definition, are executed independently of other nodes' operations and in parallel with other operations executed by the node and by other nodes in the linear communication orbit. In some embodiments, the node pre-processes local event data while awaiting a map request from a server system, where the map request is to extract the pre-processed local event data from the local mapping database and to send the extracted information to the server system (e.g., via the linear communication orbit, as part of the response portion of the map request).

Method 500 further includes the server system sending (504) a map request through the linear communication orbit. Like the map definition, the map request is propagated along the linear communication orbit. For example, the map request is propagated from a starting node (e.g., a node in the linear communication orbit, or server 108, which in the topology shown in FIGS. 1A-1B can be viewed as a starting node in the linear communication orbit 106*a*) to a respective node through one or more upstream nodes of the respective node (e.g., nodes 102*b*-102*e*, when node 102*f* is the respective node) along the linear communication orbit. It is noted that the map request is typically sent through the linear communication orbit, to nodes on the linear communication orbit, after those same nodes have pre-processed event information stored in the local event database in accordance with one or more application definitions previously sent by the server system to those nodes.

In some embodiments, an automatic process performed by the server system generates and sends pre-defined map requests to nodes in the managed network. The pre-defined map requests may be sent periodically, according to a predefined schedule, or in response to a user request. In some embodiments, an administrator may send a map request to the server system via an administrator's device.

In some embodiments, a map request is a query message that includes a set of parameters or filter criteria that indicate the set of information being requested, and in response to the map request, each node that receives the map request and that has information relevant to the map request returns the requested information (e.g., records in its mapping database that match the parameters or filter criteria specified by the map request) to the server system that sent the map request. In some embodiments, the map request is a request for the information needed to generate an application based map, or a request for the information needed to generate an endpoint based map (described with reference to FIG. 3A). In some embodiments, the map request sent by the server system (at 504) is for retrieving the information required to generate an application based map and the map request includes one or more parameters identifying a target application, where the target application is the specified application. In some other embodiments, the map request is for retrieving the information required to generate an endpoint based map and the map request includes one or more parameters identifying one or more target nodes. In some embodiments, the map request may include one or more parameters identifying one or more target nodes and/or one or more target applications. Table 1 below illustrates an example of a map request for a target application, in accordance with some embodiments.

TABLE 1

Get Map - Application Connections [MyApp,24,greater than,5,greater than,30] And Computer Name And IP Address And Chassis Type And Map - Active Applications[24] from Machines where Location Tag contains "North America"

In response to the map request, the server system receives (510) from a first node of the linear communication orbit, via the linear communication orbit, information corresponding to at least a subset of metadata associated with one or more operations performed by the first node that meet the application definition (i.e., the application definition sent in step 502). In some embodiments, the respective node may send, in addition to the event metadata itself, a summary of (number of connections, duration and frequency of connections, or other counters) or information about the metadata (e.g., a link to metadata). In some embodiments, a summary of the event data extracted from the local mapping database may be generated by the server.

The server system builds (510) a map based on responses to the map request by the first node and at least one other node in the network. For example, the map is generated using event metadata sent by the first node, and the at least one other node, in response to the map request. As described above with respect to method 400, each node (e.g., the aforementioned first node and at least one other node in the network) that receives the application definition for a target application and that has stored event information relevant to the application definition, responds to the map request by sending to the server system, from its local mapping database, pre-processed event metadata that is associated with a target application definition (e.g., the specified application definition sent to the nodes in step 502).

In some embodiments, the first node may respond to the map request with information identifying every connection (e.g., TCP connection or connection using any other communication protocol) (along with associated process, port, timestamp, and other relevant data) logged in the local event database that meets the application definition of the target application identified in the map request. For example, the query of Table 1 returns information regarding connections during the last 24 hours, or the last 24 hour-long periods that have completed prior to the map request being received by a respective node, but only connections that (A) occur more than 5 times per time period (e.g., per hour-long time period) and (B) that have an average duration of at least 30 seconds during the time period. In this example, only machines having a location tag corresponding to a location in "North America" respond to the query. The parameter 'MyApp' is populated with a value of the application specified in the application definition on which the map request is based. More generally, a map request can include multiple filter criteria that are combined using Boolean operators, such as logical 'AND' and logical 'OR' to produce an expression that represents the specified combination of filter criteria. The query of Table 1 returns information concerning the connections which meet the filter criteria. The query of Table 1 further returns computer names, IP addresses, and chassis type information for each responding node (or machine). Table 2 below illustrates prophetic data returned in response to the query of Table 1.

TABLE 2

| Map - Application Connections[MyApp,24, greater than,5,greater than,30] | Computer Name | IP Address | Chassis Type | Map - Active Applications [24] |
|---|---|---|---|---|
| 10.65.156.221, 80, outbound, 275, 1 22.115.150.200, 8649, inbound, 2, 2 | MyAppServer1 | 10.123.53.130 | Server | 9, 12, 13 |
| 10.123.53.130, 80, inbound, 275, 1 192.168.56.10, 17472, inbound, 1, 18 | AnotherAppServer | 10.65.156.221 | Server | 1, 4, 9 |

While Table 2 shows just two rows or map records, in some embodiments, the response to a map request includes a distinct record for each time period (e.g., for each one-hour time period) for which the responding node has event information meeting the filter criteria specified by the map request. In this example, the left column of Table 2 represents a summary of all the connections performed at the respective node satisfying the query, either for the entire time period specified by the query or for an included time period of predefined duration (e.g., a one hour time period), as well as metadata associated with each connection such as IP addresses of an entity on the other side of the connection with the respective node, a port used for the connection, direction of the connection, a counter or the number of times the particular connection has occurred, and average duration of the connection. For example, respective node with computer name 'MyAppServer1' and IP address '10.123.53.130' communicated 275 times with another node with computer name 'AnotherAppServer' and IP address '10.65.156.221'. In particular, in this example, during the last 24 hours, 'MyAppServer1' issued 275 an outbound connection 275 times to 'AnotherAppServer' on port 80 and 'AnotherAppServer' received the inbound connection from MyAppServer1' 275 times on port 80. In some embodiments, a map data visualization may be based on data returned by one or more nodes in response to a map request, such as the data included in Table 2.

After the server system receives the subset of metadata associated with the one or more operations (e.g., by receiving responses to the aforementioned map request from the first node and the at least one other node), the server system builds (512) an application based map representing data communications between the first node and the at least one other node in association with the specified application.

In some embodiments, as illustrated in Table 2, the server may receive responses from more than one node in the network (e.g., nodes 'MyAppServer1' and 'AnotherAppServer'). For example, in some embodiments or in some circumstances, in response to the map request, the server receives (514) a response from a second node of the linear communication orbit, via the linear communication orbit. In some embodiments, the response by the second node propagates though the linear communication orbit from node to node, as the response portion of the map request, or as part of a separate answer message, according to rules governing the conveyance of messages by the linear communication orbit. The response from the second node includes information corresponding to at least a subset of metadata associated with one or more operations performed by the second node that meet the application definition. As noted above, in some embodiments, the information included in the response by the second node corresponds to both the application definition and any filter criteria specified by the map request.

In some embodiments, the server system builds (516) an application based map based on the responses to the map request by the first node and the second node in the linear communication orbit. Furthermore, in some such embodiments, the application based map includes (518) information representing data communications between the first node and second node in association with the specified application (e.g., data communications conveyed between the first node and second node in conjunction with execution of the specified application). For example, the application based map is based on the responses to the map request sent by the first node and the second node in the linear communication orbit.

In some embodiments, after receiving the subset of metadata associated with the one or more operations performed by the respective node that meet the application definition, the server system builds (520) an endpoint based map representing data connections with the first node in association with one or more applications including the specified application (e.g., data connections with one or more other nodes formed or used in conjunction with execution of the one or more applications, or data communications conveyed between the first node and one or more other nodes in conjunction with execution of the one or more applications). In some embodiments, the information for building an endpoint based map is obtained in response to a map request that is not specific to any one specific application or any specified set of applications, and instead is obtained in response to a map request that includes other filter criteria, but no filter criteria that directly specify one or more particular applications (e.g., a map request that does not reference any application definitions).

In some embodiments, the application definition is a first application definition for a first specified application, and the server system sends (522) sending a second application definition through the linear communication orbit. The second application definition propagates from node to node along the linear communication orbit, and specifies criteria for establishing which nodes execute a second specified application, a component of the second specified application, or communicate with another node executing the specified application or a component of the second specified application. Furthermore, in response to the map request (or in response to a second map request sent by the server system), the server system receives (524) from the first node, via the linear communication orbit, information corresponding to at least a subset of metadata associated with one or more operations performed by the first node that meet the second application definition. Thus, in some embodiments, the server system can send multiple application definitions to nodes in the network, and receive corresponding information from those nodes in response to map requests.

Figure 6:
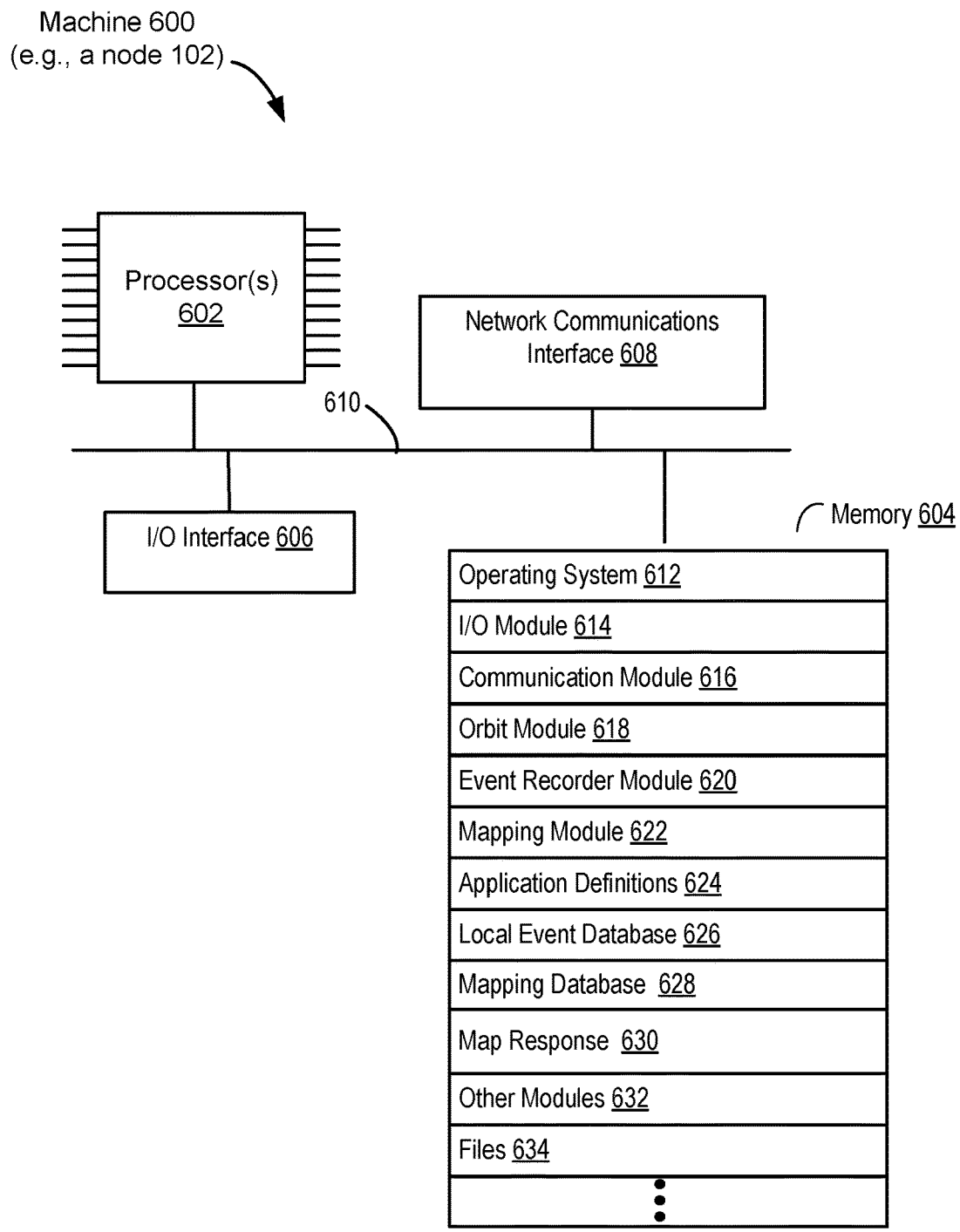
FIG. 6 is a block diagram of a system (e.g., an exemplary node) in accordance with some embodiments.

FIG. 6 is a block diagram of an exemplary machine 600 (e.g., serving as a node 102 shown in FIGS. 1A-1B). In some implementations, machine 600 includes one or more processors 602, memory 604 for storing programs and instructions for execution by one or more processors 602, one or more communications interfaces such as input/output interface 606 and network interface 608, and one or more communications buses 610 for interconnecting these components.

In some embodiments, input/output interface 606 includes a display and input devices such as a keyboard, a mouse or a track-pad. In some embodiments, communication buses 610 include circuitry (sometimes called a chipset) that interconnects and controls communications between system components. In some embodiments, memory 604 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 604 includes one or more storage devices remotely located from the one or more processors 602. In some embodiments, memory 604, or alternatively the non-volatile memory device(s) within memory 604, comprises a non-transitory computer readable storage medium.

In some embodiments, memory 604 or alternatively the non-transitory computer readable storage medium of memory 604 stores the following programs, modules and data structures, instructions, or a subset thereof:

Operating System 612 that includes procedures for handling various basic system services and for performing hardware dependent tasks.

I/O module 614 that includes procedures for handling various basic input and output functions through one or more input and output devices.

Communication module 616 that is used for connecting machine 600 to other machines (e.g., other machines 102 in network 100), administrator's machine 116 (e.g., a computer system or computer implemented device, as discussed below with reference to FIG. 7), servers (e.g., server 108/110) via one or more network communication interfaces 608 (wired or wireless) and one or more communication networks, such as the Internet, other wide area networks, local area networks, metropolitan area networks, and so on.

Orbit formation and maintenance module 618 that includes instructions to self-insert machine 600 into a linear communication orbit and self-healing from a broken link in the linear communication orbit, as described in more detail in the Incorporated Disclosure.

Event recorder module 620, which includes instructions for storing, in local event database 626, metadata representing locally performed operations and/or local events meeting predefined definitions, such as data communications with other nodes, formation and termination of data connections, file events (e.g., formation, opening, closing, data storage events, file metadata modifications, etc.), application events (installation, specific types of application execution events, etc.). In some embodiments, the event recorder module 620 records system events (e.g., kernel events), instead of, or in addition to application level events. Event recorder module 620 populates local event database 626 in accordance with one or more definitions.

The event recorder module 620 is a process independent of operations of the mapping module 622.

Mapping module 622, which extracts metadata from the local event database 626 in accordance with each application definition of a set of locally stored application definitions 624. In some embodiments, the mapping module 622 extracts metadata from the local event database 626 and stores the extracted metadata in the mapping database 628 at predefined intervals, such as one hour intervals, in accordance with the locally stored application definitions. For example, the mapping module 622 may be an agent process that is triggered periodically according to a predefined schedule. In some embodiments, mapping module 622 is triggered in response to commands received from a server system. In some embodiments, the mapping module 622, in addition to extracting metadata for each application definition, generates a summary of the events between a respective node (e.g., machine 600) and each distinct other node or distinct entity (e.g., the entity corresponding to the IP address and port used to communication with the other node), such as number of events, average duration of each event, etc., and stores a single event summary record in the mapping database for each distinct entity with which the respective node interacted during the time period for which the summary record is generated (e.g., see Table 2).

Application definitions 624 is a local database or cache in which application definitions received by machine 600 (e.g., from a server system of administrator's system) are locally stored.

Local event database 626 is a local database populated by event recorder module 620, as described above. In some embodiments, the local event database has a predefined or user-specified maximum size, such as 1 GB. The local event database 626 typically stores events for at least 7 days (e.g., at least the 7-day period preceding the current time), and in some implementations stores events for at least 14 days (e.g., at least the 14 day-period preceding the current time).

Mapping database 628 is a local database populated by mapping module 622. In some embodiments, mapping database 628 stores a subset of the metadata stored in the local event database 626. In some embodiments, mapping database 626 stores a plurality of summary records, each summary record storing information representing a summary of events (e.g., events represented by records in the local event database 626) meeting predefined criteria for a predefined period of time (e.g., information indicating a count of such events, information representing an average duration of such events). Typically, each summary record (if any such records are included in mapping database 628) is generated for a particular time period, in a sequence of time periods (e.g., hour-long time periods), and represents a summary of events for that time period (e.g., a summary of events meeting a specific application definition, performed by or at machine 600).

Map response module 630 which includes instructions for generating responses to map requests received by machine 600. Map response module 630 retrieves event metadata from mapping database 628 in accordance with the target application and/or other filter criteria specified by the map request, generates a response based on the retrieved event metadata, and sends the response to a server system (e.g., the server system which sent the map request) via a linear communication orbit.

Other modules and applications 632 that include instructions for handling a variety of functions, such as responding to queries other than map requests, as well as other functions of machine 600.

Files 634, optionally including files having executable programs, image files containing images, and/or data files containing data of various types.

FIG. 6 is merely illustrative of the structures of a respective machine 600, which may be any of the machines at nodes 102 of a network (nodes 102 in FIGS. 1A and 1B). A person skilled in the art would recognize that particular embodiments of machines 600 may include more or fewer components than those shown. One or more modules described above may be divided into sub-modules, and/or one or more functions may be provided by different modules than those shown herein.

FIG. 7 is a block diagram of an exemplary machine 700 (e.g., serving as an administrator's machine 116 shown in FIG. 1B). In some implementations, machine 700 is a computer system or computer-implemented device that includes one or more processors 702, memory 704 for storing programs and instructions for execution by one or more processors 702, one or more communications interfaces such as input/output interface 706 and network interface 708, and one or more communications buses 710 for interconnecting these components.

In some embodiments, input/output interface 706 includes a display and input devices such as a keyboard, a mouse or a track-pad. In some embodiments, communication buses 710 include circuitry (sometimes called a chipset) that interconnects and controls communications between system components. In some embodiments, memory 704 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 704 includes one or more storage devices remotely located from the one or more processors 702. In some embodiments, memory 704, or alternatively the non-volatile memory device(s) within memory 704, comprises a non-transitory computer readable storage medium.

In some embodiments, memory 704 or alternatively the non-transitory computer readable storage medium of memory 704 stores the following programs, modules and data structures, instructions, or a subset thereof:

- Operating System 712 that includes procedures for handling various basic system services and for performing hardware dependent tasks.
- I/O module 714 that includes procedures for handling various basic input and output functions through one or more input and output devices.
- Communication module 716 that is used for connecting machine 700 to other machines (e.g., any of machines 102 in network 100) or servers (e.g., server 108, server 110) via one or more network communication interfaces 708 (wired or wireless) and one or more communication networks, such as the Internet, other wide area networks, local
- Map request module 722, which includes instructions for sending map requests to various nodes in a network (e.g., network 100, FIGS. 1A and 1B), in response to user commands or periodically in accordance with a predefined schedule. Map requests are discussed in more detail elsewhere in this document. In some embodiments, map request module 722 is also used for generating and sending application definitions to various nodes in the network.

Application definitions 724, which is a database of application definitions generated at machine 700 or elsewhere. In some embodiments, application definitions 724 includes an administrator's custom-built application definitions. In some embodiments, application definitions 724 includes pre-built (or sample) application definitions (sometimes called application definition templates), which are used as starting points for generating other application definitions.

Application and Node Mapping Module 728, for analyzing event information received in response to map requests, including generating various maps, optionally including application based maps, endpoint based maps, and/or other types of maps.

Other modules and applications 732 that include instructions for handling a variety of functions, such as responding to queries other than map requests, as well as other functions of machine 700.

Event data 732 that stores local values for event histories, event artifacts, and/or an index of indicator item evaluation results, etc. collected from the network or a particular node.

Files 734, optionally including files having executable programs, image files containing images, and/or data files containing data of various types.

Machine 700 optionally includes an event recorder module 720 (e.g., similar to event recorder module 620 of machine 600), which includes instructions for storing, in a local event database 726, metadata representing locally performed operations and/or local events meeting predefined definitions, such as data communications with other nodes, formation and termination of data connections, file events (e.g., formation, opening, closing, data storage events, file metadata modifications, etc.), application events (installation, specific types of application execution events, etc.). Machine 700 also optionally includes a local event database 726.

FIG. 7 is merely illustrative of the structures of machines 700. A person skilled in the art would recognize that particular embodiments of machines 700 may include more or fewer components than those shown. One or more modules may be divided into sub-modules, and/or one or more functions may be provided by different modules than those shown.

FIG. 8 is a block diagram of an exemplary machine 800 (e.g., serving as a server 108 of the network shown in FIGS. 1A-1B). In some implementations, machine 800 includes one or more processors 802, memory 804 for storing programs and instructions for execution by one or more processors 802, one or more communications interfaces such as input/output interface 806 and network interface 808, and one or more communications buses 810 for interconnecting these components.

In some embodiments, input/output interface 806 includes a display and input devices such as a keyboard, a mouse or a track-pad. In some embodiments, communication buses 810 include circuitry (sometimes called a chipset) that interconnects and controls communications between system components. In some embodiments, memory 804 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 804 includes one or more storage devices remotely located from the one or more processors 802. In some embodiments, memory 804, or alternatively the non-volatile memory device(s) within memory 804, comprises a non-transitory computer readable storage medium.

In some embodiments, memory 804 or alternatively the non-transitory computer readable storage medium of memory 804 stores the following programs, modules and data structures, instructions, or a subset thereof:

Operating System 812 that includes procedures for handling various basic system services and for performing hardware dependent tasks.

I/O module 814 that includes procedures for handling various basic input and output functions through one or more input and output devices.

Communication module 816 that is used for connecting machine 800 to other machines (e.g., machines 102 in network 100, an administrator's device 116, etc.) or servers (e.g., remote server 110) via one or more network communication interfaces 808 (wired or wireless) and one or more communication networks, such as the Internet, other wide area networks, local area networks, metropolitan area networks, and so on.

Orbit formation and maintenance module 818 that includes instructions to self-insert machine 800 into a linear communication orbit and self-healing from a broken link in the linear communication orbit, as described in more detail in the Incorporated Disclosure.

Event recorder module 820 (e.g., similar to event recorder module 620 of machine 600), which includes instructions for storing, in a local event database 826, metadata representing locally performed operations and/or local events meeting predefined definitions, such as data communications with other nodes, formation and termination of data connections, file events (e.g., formation, opening, closing, data storage events, file metadata modifications, etc.), application events (installation, specific types of application execution events, etc.). The event recorder module 820 is a process independent of operations of the mapping module 822.

Mapping module 822 (e.g., similar to mapping module 622 of machine 600), which includes instructions for extracting metadata from local event database 826 in accordance in accordance with each application definition of a set of locally stored application definitions 824. For additional details, see the description of mapping module 622, which is equally applicable to mapping module 822.

Application definitions 824 is a local database in which application definitions received by machine 800 (e.g., from a server system or administrator's machine) are locally stored.

Local event database 826 is a local database populated by event recorder module 820, as described above with respect to local event database 626 and event recorder 620 of machine 600. For additional details, see the description of local event database 626, which is equally applicable to local event database 826.

Mapping database 828 is a local database populated by mapping module 822, as described above with respect to mapping database 628 and mapping module 622 of machine 600. For additional details, see the description of mapping database 628, which is equally applicable to local event database 826.

Map response module 830, which includes instructions for generating responses to map requests received by machine 800. For additional details, see the description of map response module 630, which is equally applicable to map response module 830.

Map request module 831, which includes instructions for sending map requests to various nodes in a network (e.g., network 100, FIGS. 1A and 1B), in response to user commands or periodically in accordance with a predefined schedule. Typically, a mapping request module is included in an administrator's machine (e.g., machine 700 or administrator's machine 116), but is optionally included in a server system 108 or 110 instead or in addition. For additional details, see the description of map request module 722, which is equally applicable to map request module 831.

Other modules 822 that include instructions for handling a variety of functions, such as forwarding instructions, queries, requests from the administrator's device and/or the remote investigating server along the linear communication orbit, and forwarding responses and answers collected from the network to the administrator's device and/or the remote investigating server.

Collected data 824, which is a local database that is optionally used to store raw and/or processed data collected from other nodes or machines in the network in response to map requests sent by map request module 831. In some embodiments, collected data 824 may include data such as data illustrated in Table 2.

Files 826, optionally including files having executable programs, image files containing images, and/or data files containing data of various types.

FIG. 8 is merely illustrative of the structures of machines 800. A person skilled in the art would recognize that particular embodiments of machines 800 may include more or fewer components than those shown. One or more modules may be divided into sub-modules, and/or one or more functions may be provided by different modules than those shown.

FIG. 9 is a block diagram of an exemplary machine 900 (e.g., serving as a remote investigating server 110, sometimes herein called remote server 110, shown in FIG. 1B). In some implementations, machine 900 includes one or more processors 902, memory 904 for storing programs and instructions for execution by one or more processors 902, one or more communications interfaces such as input/output interface 906 and network interface 908, and one or more communications buses 910 for interconnecting these components.

In some embodiments, input/output interface 906 includes a display and input devices such as a keyboard, a mouse or a track-pad. In some embodiments, communication buses 910 include circuitry (sometimes called a chipset) that interconnects and controls communications between system components. In some embodiments, memory 904 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 904 includes one or more storage devices remotely located from the one or more processors 902. In some embodiments, memory 904, or alternatively the non-volatile memory device(s) within memory 904, comprises a non-transitory computer readable storage medium.

In some embodiments, memory 904 or alternatively the non-transitory computer readable storage medium of memory 904 stores the following programs, modules and data structures, instructions, or a subset thereof:

Operating System 912 that includes procedures for handling various basic system services and for performing hardware dependent tasks.

I/O module 914 that includes procedures for handling various basic input and output functions through one or more input and output devices.

Communication module 916 that is used for connecting machine 900 to other machines (e.g., machines 102 in network 100, an administrator's device 116) or servers (e.g., remote server 110) via one or more network communication interfaces 908 (wired or wireless) and one or more communication networks, such as the Internet, other wide area networks, local area networks, metropolitan area networks, and so on.

Investigative module 920 that includes instructions to: generate an instruction packet for a specified node on a linear communication orbit (e.g., node 102-$f$ on linear communication orbit 106a, FIG. 1B) to initiate an outbound connection to the machine 900 (e.g., investigating server 110, FIG. 1B); send the instruction packet to the specified node through the linear communication orbit, establish a direct full duplex connection at the request of the node, communicate with the node through the direct full duplex connection (e.g., to obtain data from the node's local event database and/or mapping database); issue queries through one or more servers (e.g., server 108) to obtain information from other nodes in the linear communication orbit or elsewhere in the network, either through linear communication orbits in the network or by establishing additional direct full duplex connections with one or more other nodes; perform investigative tasks, including analyzing the collected data (e.g., event information relevant to specific application definitions; event information relevant to operations performed by the specified node and/or other nodes, etc.) and generating reports based on the analysis (e.g., application based maps, endpoint based maps, as well as other types of reports). The reports may include information relevant to determining what applications and other processes are being executed by the specified node and other nodes, and for generating additional and/or modified application definitions.

Other modules 932 that include instructions for handling other functions and aspects described herein. Modules 922 optionally include some or all of the modules described above with respect to machine 800 that are used to obtaining event information from nodes in the network and building maps based on the obtained event information.

Collected data 934 which is a local database that is optionally used to store raw and/or processed data collected from the specified node and/or other nodes or machines in the network in response to queries sent to those nodes or machines, for example, metadata of operations meeting filter criteria, extracted from local event databases and mapping databases maintained at the nodes in the network. In some embodiments, collected data 924 may include data such as data illustrated in Table 2.

Files 936, optionally including files having executable programs, image files containing images, and/or data files containing data of various types.

FIG. 9 is merely illustrative of the structures of machines 900. A person skilled in the art would recognize that particular embodiments of machines 900 may include more or fewer components than those shown. One or more modules may be divided into sub-modules, and/or one or more functions may be provided by different modules than those shown.

FIG. 10 illustrates an example mapping system 1000 that maps events in a network including a plurality of machines located at a non-static collection of nodes that form a linear communication orbit 1002 in accordance with some embodiments. Each machine of the plurality of machines has a respective machine identifier, and the plurality of machines have self-organized into an ordered sequence in accordance with a predefined order of the respective machine identifiers of the plurality of machines. In mapping system 1000, a server system 1004 is coupled to linear communication orbit 1002 at a head node 1006. In addition to head node 1006, linear communication orbit 1002 further includes a tail node 1008 and a plurality of intermediate machines (e.g., machines M1-M5) 1010-1018 which are coupled between head node 1006 and tail node 1008. While intermediate machines 1010-1018 illustrate the configuration of linear communication orbit 1002, in some embodiments, linear communication orbit 1002 includes only one intermediate machine, while in other embodiments, it includes dozens, hundreds or even thousands of intermediate machines.

Server system 1004 obtains or generates an application definition of a specified application, and deploys the application definition through linear communication orbit 1002 to two or more machines (e.g., one of which is computational machine (M1) 1010) of the plurality of machines located at a first subset of nodes in linear communication orbit 1002. Specifically, the application definition is provided to head node 1006 by remote server 1004, and propagates from node to node along a command path 1022, also herein called a request path, following linear communication orbit 1002, and the application definition is thereby provided to each of the two or more machines. Each of the two or more machines is configured to perform a set of mapping operations locally according to the received application definition (e.g., in accordance with process 400, FIGS. 4A-4F).

Each machine or node in linear communication orbit that receives the application definition optionally passes (e.g., transmits or forwards) the application definition to next downstream machine, if any, on the linear communication orbit 1002. Alternatively, the node forgoes passing the application definition along the linear communication orbit 1002 to a next downstream machine. For example, in some embodiments, the node determines, based on filter criteria included with the application definition, whether it is the last node in the linear communication orbit 1002 to which the application definition is being sent, and in accordance with a determination that it is the last such node, the node forgoes passing the application definition along the linear communication orbit 1002 to a next downstream machine. Stated another way, in some embodiments, if a computational machine at a respective node (e.g., computational machine (M1) 1010) determines that it is the last one of the two or more machines that need to receive the application definition, that computational machine forgoes passing the application definition along the linear communication orbit 1002.

The application definition includes criteria for establishing which nodes execute a specified application, a component of the specified application, or communicate with another node executing the specified application or a component of the specified application. Event information collected by the two or nodes in accordance with the application definition, and optionally other application definitions as well, enables the server system 1004 (or other server in the network, or other computer system (e.g., administrative machine 1020, or investigative server 1040) that receives the event information) to identify components of one or more applications across the environment (e.g., the managed network) and show how the components interrelate or interoperate. In some embodiments, the application definition identifies (e.g., by file name) at least one component of the specified application and corresponding inbound or outbound ports for connection to or from the specified component (408).

In some embodiments, the server system 1004 is coupled to an administrator machine 1020. The server system 1004 receives from the administrator machine an instruction to deploy the application definition to the in linear communication orbit 1002. The instruction includes the application definition. In some embodiments, the instruction may be to deploy the application definition to all nodes in the linear communication orbit 1002. In some embodiments, the instruction may also include identifiers of a first subset of nodes including the respective node, or may include filter criteria specifying machine characteristics satisfied by only a subset of the nodes (e.g., the first subset) in the linear communication orbit 1002. In some embodiments, each of the first subset of nodes is selected individually by a user on the administrator machine 1020. In some embodiments, the first subset of nodes are selected on the administrator machine 1020 based on node selection criteria (e.g., whether the respective node executes a target operating system, or whether the respective node is configured to comply with a particular security requirement). For example, a user can select all nodes of linear communication 1002 that run a specific operating system as the first subset of nodes. The user may optionally add or exclude a subset of the nodes running the specific operating system from the first subset of nodes.

The user can also select (or generate) one or more application definitions to be processed locally at the respective node. The user may specify for each application component (a process, a file system, a registry) identified in the application definition associated connections (e.g., by port number and connection type—inbound or outbound). In some embodiments, the user selects or defines the same application definition for use by each node in the linear communication orbit 1002 (optionally, each node of the first subset of nodes), while in some other embodiments, the user selects or defines different application definitions (e.g., with different connection or application components) to be sent to different specified nodes in the linear communication orbit 1002.

Optionally, administrator machine 1020 is coupled to server system 1004, but does not belong to linear communication orbit 1002 on which the application definition is deployed. Optionally, administrator machine 1020 is integrated within server system 1004. Optionally, administrator machine 1020 is coupled on linear communication orbit 1002 and is configured to function as an administrator to control deployment of application definitions and collection of local event information from nodes on linear communication orbit 1002.

As described above with reference to method 400, the computational machine (e.g., computational machine (M1) 1010) at a respective node of linear communication orbit 1002 identifies events that occur locally at the respective node in real-time while the events are occurring, including a plurality of events that are consistent with an application definition received by the respective node. Local processing of events by the computation machine at a respective node of linear communication orbit 1002, as well as processing of application definitions received by the computational machine and processing of map requests received by the computational machine, is described in more detail above, with reference to FIGS. 4A-4F.

Server system 1004 deploys a map request to the respective node in linear communication orbit 1002 (e.g., along command path 1022 following linear communication orbit 1002). The map request propagates from node to node along linear communication orbit 1002 until it reaches the respective node (e.g., computational machine (M1) 1010). Specifically, in an example, the map request is provided to head node 1006 by server system 1004, and passes computational machines 1012 and 1014 until reaching computational machine (M1) 1010. In some situations, computational machine (M1) 1010 continues to pass the map request to one or more other downstream machines (e.g., computational machine 1016) on the linear communication orbit 1002. However, in some situations, in accordance with a determination that it is the last one of two or more machines that need to report metadata for operations associated with the one or more components specified in the application definition, computational machine (M1) 1010 forgoes passing the map request along the linear communication orbit 1002.

In some embodiments, server system 1004, administrative machine 1020 or investigative server 1040 periodically deploys the map request to linear communication orbit 1002 according to a predetermined schedule (e.g., a regular interval of every 30 minutes, every hour, or at a set of predefined times in each day, week or month). Alternatively, or in addition, in some embodiments, server system 1004, administrative machine 1020 or investigative server 1040 deploys the map request to linear communication orbit 1002 upon receiving a user request entered from administrator machine 1020.

After receiving the map request through linear communication orbit 1002, the computational machine (e.g., M1 1010) at the respective node of linear communication orbit 1002 identifies a subset of the event information in the local mapping database in accordance with the map request and returns the response to server system 1004 through linear communication orbit 1002. The computational machine responds to the map request with information (e.g., metadata, or a summary of metadata) corresponding to at least a subset of the metadata stored in the local mapping database of the respective node in association with the application definition identified by the map request. For example, computational machine (M1) 1010 receives the map request from server system 1004 via head node 1006, and sends the identified subset or analysis of the event information to server system 1004 along a report path A or a report path B. Report path A extends to remote server 1004 via head node 1006 and has a direction that is opposite to the direction of command path 1022 along which the map request is passed along linear communication orbit 1002. Report path B extends to server system 1004 via tail node 1008 and has a direction that is the same as the direction of command path 1022. In some embodiments, when the identified subset of the event information generated by computational machine (M1) 1010 passes an intermediate machine (e.g., computational machine (M2) 1012) on report path A or B, the local subset of the event information generated by the intermediate machine is combined with the subset of the event information generated by a computational machine located upstream on the corresponding report path to produce an aggregated event information message (also called a response message). In some embodiments, the aggregated event information message or response message is the map request message, and the aggregated event information is included in a response portion of the map request message. The aggregated event information message is sent to server system 1004 along the report path. Further, in some embodiments, after receiving event information from the first subset of nodes to which the application definition has been deployed, server system 1004 generates a map based on the received event information, where the received event information includes at least subset of metadata, or information corresponding to the subset of metadata, and/or a summary of the metadata of one or more operations meeting the application definition.

It is noted that a computational machine in linear communication orbit 1002 optionally returns metadata, or information about the metadata, corresponding to the one or more operations meeting the application definition independently of other computational machines on linear communication orbit 1002, or alternatively, returns metadata, or information about the metadata, corresponding to the one or more meeting the application definition with the event information of the other computational machine in an aggregated manner, as described above.

The event information collected from the mapping database of the respective node of linear communication orbit 1002 corresponds to one or more operations performed by the respective node meeting the application definition. In some implementations, the map request includes additional filters, and the event information for the identified plurality of events corresponds to event information in the local mapping database that satisfies the additional filters. In some implementations, the map request defines a time window within which one or more events of interest occurred, the events of interest corresponding to the one or more operation meeting the application definition. In accordance with such additional filters, the computational machine at the respective node reports event information from the local mapping database for at least some operations that occurred within the time window according to the application definition. In some embodiments, server system 1004 identifies one or more operations of interest by filtering the subset of metadata corresponding to one or more operations meeting the application definition according to the additional filters, after it receives the subset of the metadata from the respective node of linear communication orbit 1002

The event information collected from the mapping database of the computational machine enables the server to build a map based on responses to the map request by the computation machine and at least one other machine in the network. Further details are provided above with respect to method 400 of FIG. 4A-4F and method 500 of FIG. 5A-B.

The foregoing description has been provided with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles disclosed and their practical applications, to thereby enable others to best utilize the disclosure and various embodiments with various modifications as are suited to the particular use contemplated.

It will be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, without changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of mapping a network comprising a plurality of machines located at a non-static collection of nodes that form a linear communication orbit, the method comprising:
at a respective node in the linear communication orbit, wherein each node in the linear communication orbit includes a machine identifier for a respective machine, of the plurality of machines, at the node, and the nodes have self-organized into an ordered sequence in accordance with a predefined order of the respective machine identifiers of the non-static collection of nodes in the linear communication orbit, performing a set of mapping operations comprising:
receiving an application definition through the linear communication orbit, wherein the application definition is sent by a server system coupled to the linear communication orbit, and propagates from node to node along the linear communication orbit, and the application definition specifies criteria for establishing which nodes execute a specified application, a component of the specified application, or communicate with another node executing the specified application or a component of the specified application;
determining that the respective node performs one or more operations meeting the application definition, including identifying the one or more operations by the respective node that satisfy the application definition;
in accordance with the determination that the respective node performs the one or more operations meeting the application definition, identifying metadata associated with the one or more operations performed by the node that meet the application definition;
receiving a map request through the linear communication orbit, wherein the map request is sent by the server system, and propagates from node to node along the linear communication orbit until reaching the respective node; and
in response to the map request, responding to the server system through the linear communication orbit by sending information corresponding to at least a subset of the metadata associated with the one or more operations performed by the respective node that meet the application definition, the sent information enabling the server system to build a map based on responses to the map request by the respective node and at least one other node in the network.

2. The method of claim 1, wherein the subset of the metadata includes a first subset of metadata associated with a first plurality of operations performed by the respective node that meet the application definition, further comprising:
at the respective node, in response to the map request:
receiving a second subset of metadata associated with a second plurality of operations performed at a second node in the linear communication orbit, the second node being distinct from the respective node, the second plurality of operations meeting the application definition; and
aggregating the first subset of metadata associated with the first plurality of operations performed at the respective node and the second subset of metadata associated with the second plurality of operations performed at the second node, wherein the aggregated first and second subsets of metadata are returned to the server system via the linear communication orbit.

3. The method of claim 1, further comprising:
storing in a mapping database at the respective node the metadata, or information corresponding to the metadata, associated with the one or more operations performed by the respective node that meet the application definition, and
in response to the map request, identifying in the mapping database the subset of the metadata associated with the one or more operations performed by the respective node that meet the application definition, and sending to the server system the identified subset of the metadata associated with the one or more operations performed by the respective node that meet the application definition.

4. The method of claim 1, wherein the respective node includes a local event database storing metadata for predefined events occurring at the respective node, corresponding to operations performed at the respective node, and the operations performed at the respective node include the one or more operations that satisfy the application definition.

5. The method of claim 4, further comprising:
storing in a mapping database the metadata associated with the one or more operations performed by the respective node that meet the application definition, the mapping database being configured to store information corresponding to a subset of data stored in the local event database and having a size smaller than that of the local event database.

6. The method of claim 1, wherein the one or more operations meeting the application definition include operations performed before the application definition is received at the respective node through the linear communication orbit, such that the one or more operations and corresponding metadata associated with the one or more operations are retroactively identified according to the application definition.

7. The method of claim 1, wherein the one or more operations meeting the application definition include a first subset of operations performed before the application definition is received at the respective node through the linear communication orbit, and a second subset of operations performed after the application definition is received at the respective node through the linear communication orbit.

8. The method of claim 1, wherein the map request includes one or more filters specifying at least one of a time range, a number of connections, a frequency of connection, and a duration of connection with respect to the one or more operations performed by the respective node that meet the application definition, further comprising:
in response to the map request, identifying the subset of the metadata associated with the one or more operations performed by the respective node that meet the application definition in accordance with the one or more filters.

9. The method of claim 8, wherein the one or more filters further specify a computer group according to at least one machine characteristic, and the respective node has the at least one machine characteristic and the computer group includes the respective node.

10. The method of claim 8, wherein the server system is coupled to an administrator machine, further comprising:
at the server system, receiving from the administrator machine a map instruction to send the map request to the linear communication orbit, wherein the map instruction specifies the one or more filters.

11. The method of claim 1, wherein responding to the server system includes sending to the server system at least one of: an IP address of the respective node, information identifying a user associated with the one or more operations meeting the application definition, a location of the respective node, a time zone of the respective node, and a chassis type of the respective node.

12. The method of claim 1, wherein the sent information corresponding to the at least a subset of the metadata associated with the one or more operations includes a link to the at least a subset of the metadata associated with the one or more operations.

13. The method of claim 1, wherein the sent information corresponding to at least a subset of the metadata associated with the one or more operations includes metadata associated with a subset of the one or more operations performed by the respective node that meet the application definition.

14. The method of claim 1, wherein the server system is coupled to an administrator machine, further comprising
at the server system, receiving from the administrator machine an application definition deployment instruction to deploy the application definition to a first subset of nodes in the linear communication orbit, the application definition deployment instruction includes the application definition and identifiers of the first subset of nodes including the respective node.

15. The method of claim 1, wherein the map request is received periodically from the server system according to a predetermined schedule.

16. The method of claim 1, further comprising:
receiving from the server system a direct communication instruction for establishing a direct duplex connection between the respective node and a remote server;
in response to receiving the direct communication instruction through the linear communication orbit, sending an outbound connection request to the remote server to establish the direct duplex connection between the respective node and the remote server; and
uploading local context data related to the one or more operations to the remote server through the direct duplex connection, wherein the remote server is configured to perform analysis on the local context data received from the respective node to investigate one of the one or more operations performed at the respective node that meet the application definition.

17. The method of claim 16, wherein the direct duplex connection is a secure websocket connection.

18. The method of claim 1, further comprising:
at the server system, after receiving the subset of the metadata associated with the one or more operations performed by the respective node that meet the application definition, identifying the one of the one or more operations as an operation of interest by filtering the subset of the metadata according to a map criterion.

19. The method of claim 1, wherein the at least one other node is located at the linear communication orbit.

20. The method of claim 1, wherein the linear communication orbit is a first linear communication orbit coupled to the server system, and the at least one other node is located at a second linear communication orbit coupled to the server system, the second linear communication orbit being distinct from the first linear communication orbit.

21. The method of claim 1, wherein the application definition identifies a component of the specified application and at least one of inbound or outbound port for connection to or from the identified component.

22. A computational machine for mapping a network comprising a plurality of machines located at a non-static collection of nodes that form a linear communication orbit, comprising:
one or more processors; and
memory having instructions stored therein, which when executed by the one or more processors cause the computational machine to perform a set of mapping operations including:
at a respective node in the linear communication orbit, wherein each node in the linear communication orbit includes a machine identifier for a respective machine, of the plurality of machines, at the node, and the nodes have self-organized into an ordered sequence in accordance with a predefined order of the respective machine identifiers of the non-static collection of nodes in the linear communication orbit:
receiving an application definition through the linear communication orbit, wherein the application definition is sent by a server system coupled to the linear communication orbit, and propagates from node to node along the linear communication orbit, and the application definition specifies criteria for establishing which nodes execute a specified application, a component of the specified application, or communicate with another node executing the specified application or a component of the specified application;
determining that the respective node performs one or more operations meeting the application definition, including identifying the one or more operations by the respective node that satisfy the application definition;

in accordance with the determination that the respective node performs the one or more operations meeting the application definition, identifying metadata associated with the one or more operations performed by the node that meet the application definition;

receiving a map request through the linear communication orbit, wherein the map request is sent by the server system, and propagates from node to node along the linear communication orbit until reaching the respective node; and in response to the map request, responding to the server system through the linear communication orbit by sending information corresponding to at least a subset of the metadata associated with the one or more operations performed by the respective node that meet the application definition, the sent information enabling the server system to build a map based on responses to the map request by the respective node and at least one other node in the network.

23. A non-transitory computer readable storage medium storing one or more programs configured for execution by a computational machine for mapping a network comprising a plurality of machines located at a non-static collection of nodes that form a linear communication orbit, the one or more programs comprising instructions for:

at a respective node in the linear communication orbit, wherein each node in the linear communication orbit includes a machine identifier for a respective machine, of the plurality of machines, at the node, and the nodes have self-organized into an ordered sequence in accordance with a predefined order of the respective machine identifiers of the non-static collection of nodes in the linear communication orbit:

receiving an application definition through the linear communication orbit, wherein the application definition is sent by a server system coupled to the linear communication orbit, and propagates from node to node along the linear communication orbit, and the application definition specifies criteria for establishing which nodes execute a specified application, a component of the specified application, or communicate with another node executing the specified application or a component of the specified application;

determining that the respective node performs one or more operations meeting the application definition, including identifying the one or more operations by the respective node that satisfy the application definition;

in accordance with the determination that the respective node performs the one or more operations meeting the application definition, identifying metadata associated with the one or more operations performed by the node that meet the application definition;

receiving a map request through the linear communication orbit, wherein the map request is sent by the server system, and propagates from node to node along the linear communication orbit until reaching the respective node; and in response to the map request, responding to the server system through the linear communication orbit by sending information corresponding to at least a subset of the metadata associated with the one or more operations performed by the respective node that meet the application definition, the sent information enabling the server system to build a map based on responses to the map request by the respective node and at least one other node in the network.

24. The computational machine of claim 22, wherein:

the subset of the metadata includes a first subset of metadata associated with a first plurality of operations performed by the respective node that meet the application definition; and the instructions stored in memory include instructions, which when executed by the one or more processors cause the computational machine to perform operations including:

at the respective node, in response to the map request:

receiving a second subset of metadata associated with a second plurality of operations performed at a second node in the linear communication orbit, the second node being distinct from the respective node, the second plurality of operations meeting the application definition; and aggregating the first subset of metadata associated with the first plurality of operations performed at the respective node and the second subset of metadata associated with the second plurality of operations performed at the second node, wherein the aggregated first and second subsets of metadata are returned to the server system via the linear communication orbit.

25. The computational machine of claim 22, wherein the instructions stored in memory include instructions, which when executed by the one or more processors cause the computational machine to perform operations including:

storing in a mapping database at the respective node the metadata, or information corresponding to the metadata, associated with the one or more operations performed by the respective node that meet the application definition, and in response to the map request, identifying in the mapping database the subset of the metadata associated with the one or more operations performed by the respective node that meet the application definition, and sending to the server system the identified subset of the metadata associated with the one or more operations performed by the respective node that meet the application definition.

26. The computational machine of claim 22, wherein the respective node includes a local event database storing metadata for predefined events occurring at the respective node, corresponding to operations performed at the respective node, and the operations performed at the respective node include the one or more operations that satisfy the application definition.

27. The computational machine of claim 26, wherein the instructions stored in memory include instructions, which when executed by the one or more processors cause the computational machine to perform operations including:

storing in a mapping database the metadata associated with the one or more operations performed by the respective node that meet the application definition, the mapping database being configured to store information corresponding to a subset of data stored in the local event database and having a size smaller than that of the local event database.

28. The computational machine of claim 22, wherein the one or more operations meeting the application definition include operations performed before the application definition is received at the respective node through the linear communication orbit, such that the one or more operations and corresponding metadata associated with the one or more operations are retroactively identified according to the application definition.

29. The computational machine of claim 22, wherein the one or more operations meeting the application definition include a first subset of operations performed before the application definition is received at the respective node through the linear communication orbit, and a second subset of operations performed after the application definition is received at the respective node through the linear communication orbit.

30. The computational machine of claim 22, wherein:
the map request includes one or more filters specifying at least one of a time range, a number of connections, a frequency of connection, and a duration of connection with respect to the one or more operations performed by the respective node that meet the application definition; and
the instructions stored in memory include instructions, which when executed by the one or more processors cause the computational machine to perform operations including:
in response to the map request, identifying the subset of the metadata associated with the one or more operations performed by the respective node that meet the application definition in accordance with the one or more filters.

31. The computational machine of claim 30, wherein the one or more filters further specify a computer group according to at least one machine characteristic, and the respective node has the at least one machine characteristic and the computer group includes the respective node.

32. The computational machine of claim 22, wherein responding to the server system includes sending to the server system at least one of: an IP address of the respective node, information identifying a user associated with the one or more operations meeting the application definition, a location of the respective node, a time zone of the respective node, and a chassis type of the respective node.

33. The computational machine of claim 22, wherein the sent information corresponding to the at least a subset of the metadata associated with the one or more operations includes a link to the at least a subset of the metadata associated with the one or more operations.

34. The computational machine of claim 22, wherein the sent information corresponding to at least a subset of the metadata associated with the one or more operations includes metadata associated with a subset of the one or more operations performed by the respective node that meet the application definition.

35. The computational machine of claim 22, wherein the linear communication orbit is a first linear communication orbit coupled to the server system, and the at least one other node is located at a second linear communication orbit coupled to the server system, the second linear communication orbit being distinct from the first linear communication orbit.

36. The computational machine of claim 22, wherein the application definition identifies a component of the specified application and at least one of inbound or outbound port for connection to or from the identified component.

37. The non-transitory computer readable storage medium of claim 23, wherein the subset of the metadata includes a first subset of metadata associated with a first plurality of operations performed by the respective node that meet the application definition, and the one or more programs include instructions for:
at the respective node, in response to the map request:
receiving a second subset of metadata associated with a second plurality of operations performed at a second node in the linear communication orbit, the second node being distinct from the respective node, the second plurality of operations meeting the application definition; and
aggregating the first subset of metadata associated with the first plurality of operations performed at the respective node and the second subset of metadata associated with the second plurality of operations performed at the second node, wherein the aggregated first and second subsets of metadata are returned to the server system via the linear communication orbit.

38. The non-transitory computer readable storage medium of claim 23, wherein the one or more programs include instructions for:
storing in a mapping database at the respective node the metadata, or information corresponding to the metadata, associated with the one or more operations performed by the respective node that meet the application definition, and
in response to the map request, identifying in the mapping database the subset of the metadata associated with the one or more operations performed by the respective node that meet the application definition, and sending to the server system the identified subset of the metadata associated with the one or more operations performed by the respective node that meet the application definition.

39. The non-transitory computer readable storage medium of claim 23, wherein the respective node includes a local event database storing metadata for predefined events occurring at the respective node, corresponding to operations performed at the respective node, and the operations performed at the respective node include the one or more operations that satisfy the application definition.

40. The non-transitory computer readable storage medium of claim 39, wherein the one or more programs include instructions for:
storing in a mapping database the metadata associated with the one or more operations performed by the respective node that meet the application definition, the mapping database being configured to store information corresponding to a subset of data stored in the local event database and having a size smaller than that of the local event database.

41. The non-transitory computer readable storage medium of claim 23, wherein the one or more operations meeting the application definition include operations performed before the application definition is received at the respective node through the linear communication orbit, such that the one or more operations and corresponding metadata associated with the one or more operations are retroactively identified according to the application definition.

42. The non-transitory computer readable storage medium of claim 23, wherein the one or more operations meeting the application definition include a first subset of operations performed before the application definition is received at the respective node through the linear communication orbit, and a second subset of operations performed after the application definition is received at the respective node through the linear communication orbit.

43. The non-transitory computer readable storage medium of claim 23, wherein the map request includes one or more filters specifying at least one of a time range, a number of connections, a frequency of connection, and a duration of connection with respect to the one or more operations performed by the respective node that meet the application definition, and the one or more programs include instructions for:
  in response to the map request, identifying the subset of the metadata associated with the one or more operations performed by the respective node that meet the application definition in accordance with the one or more filters.

44. The non-transitory computer readable storage medium of claim 43, wherein the one or more filters further specify a computer group according to at least one machine characteristic, and the respective node has the at least one machine characteristic and the computer group includes the respective node.

45. The non-transitory computer readable storage medium of claim 23, wherein responding to the server system further includes sending to the server system at least one of: an IP address of the respective node, information identifying a user associated with the one or more operations meeting the application definition, a location of the respective node, a time zone of the respective node, and a chassis type of the respective node.

46. The non-transitory computer readable storage medium of claim 23, wherein the sent information corresponding to the at least a subset of the metadata associated with the one or more operations includes a link to the at least a subset of the metadata associated with the one or more operations.

47. The non-transitory computer readable storage medium of claim 23, wherein the sent information corresponding to at least a subset of the metadata associated with the one or more operations includes metadata associated with a subset of the one or more operations performed by the respective node that meet the application definition.

48. The non-transitory computer readable storage medium of claim 23, wherein the linear communication orbit is a first linear communication orbit coupled to the server system, and the at least one other node is located at a second linear communication orbit coupled to the server system, the second linear communication orbit being distinct from the first linear communication orbit.

49. The non-transitory computer readable storage medium of claim 23, wherein the application definition identifies a component of the specified application and at least one of inbound or outbound port for connection to or from the identified component.

* * * * *

UNITED STATES PATENT AND TRADEMARK OFFICE
CERTIFICATE OF CORRECTION

PATENT NO. : 10,841,365 B2  
APPLICATION NO. : 16/430336  
DATED : November 17, 2020  
INVENTOR(S) : White et al.

Page 1 of 1

It is certified that error appears in the above-identified patent and that said Letters Patent is hereby corrected as shown below:

In the Claims

Claim 21, Column 48, Line 36, please delete "one of inbound" and insert --one of an inbound--;

Claim 36, Column 51, Line 61, please delete "one of inbound" and insert --one of an inbound--;

Claim 49, Column 54, Lines 21-22, please delete "one of inbound" and insert --one of an inbound--.

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*